US010059362B1

(12) United States Patent
Robillard

(10) Patent No.: US 10,059,362 B1
(45) Date of Patent: Aug. 28, 2018

(54) SNOWMOBILE SKI ASSEMBLY

(71) Applicant: BOMBARDIER RECREATIONAL PRODUCTS INC., Valcourt (CA)

(72) Inventor: Pierre-Luc Robillard, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/498,206

(22) Filed: Apr. 26, 2017

Related U.S. Application Data

(60) Provisional application No. 62/327,675, filed on Apr. 26, 2016.

(51) Int. Cl.
*B62B 17/02* (2006.01)
*B62M 27/02* (2006.01)

(52) U.S. Cl.
CPC ............. *B62B 17/02* (2013.01); *B62M 27/02* (2013.01); *B62M 2027/025* (2013.01)

(58) Field of Classification Search
CPC ........ B62B 13/18; B62B 17/02; B62M 27/02; B62M 2027/025; B64C 25/52; B64C 25/66
See application file for complete search history.

(56) References Cited

U.S. PATENT DOCUMENTS

| 3,218,006 | A | * | 11/1965 | Albright | ................. | B64C 25/66 |
| | | | | | | 244/108 |
| 3,477,734 | A | * | 11/1969 | Albertson | .............. | B62D 55/02 |
| | | | | | | 180/184 |
| 3,570,617 | A | | 3/1971 | O'Day | | |
| 4,390,151 | A | * | 6/1983 | Schneider | ............... | B64C 25/52 |
| | | | | | | 180/183 |
| 5,439,237 | A | | 8/1995 | Kutchie | | |
| 6,527,282 | B2 | | 3/2003 | Ouellette | | |
| 6,824,147 | B2 | | 11/2004 | Ouellette | | |
| 6,889,987 | B2 | * | 5/2005 | Ouellette | ............... | B62M 27/02 |
| | | | | | | 280/7.12 |
| 6,932,359 | B2 | | 8/2005 | Ouellette | | |
| 6,983,943 | B2 | | 1/2006 | Ouellette | | |

(Continued)

FOREIGN PATENT DOCUMENTS

CA 2179327 A1 12/1997
CA 2231822 A1 6/1998

(Continued)

OTHER PUBLICATIONS

Machine-generated English abstract of CA2231822A1; translated by the EPO/GOOGLE on May 2, 2017.

(Continued)

*Primary Examiner* — Hau Van Phan
(74) *Attorney, Agent, or Firm* — BCF LLP

(57) ABSTRACT

A snowmobile ski assembly has a ski having a bottom. At least one wheel is rotatably connected to the ski and a lower portion of the at least one wheel extends below the bottom of the ski. A ski runner operatively connected to the ski is movable between a first position and a second position. A bottom of the ski runner is above the lower portion of the at least one wheel when the ski runner is in the first position and the bottom of the ski runner is below the lower portion of the at least one wheel when the ski runner is in the second position.

20 Claims, 28 Drawing Sheets

(56) References Cited

U.S. PATENT DOCUMENTS

| | | | |
|---|---|---|---|
| 7,290,774 | B2 | 11/2007 | Despres |
| 7,500,678 | B1 * | 3/2009 | Whiting .................. B64C 25/52 244/108 |
| 8,191,905 | B2 | 6/2012 | Beaudoin |
| 8,490,919 | B2 | 7/2013 | Nannoni et al. |
| 8,505,929 | B2 | 8/2013 | Lachance |
| 8,801,001 | B2 | 8/2014 | Ouellette |
| 8,857,822 | B1 * | 10/2014 | Schultz .................. B62B 13/18 280/10 |
| 8,915,501 | B2 | 12/2014 | Forcier |
| 9,102,382 | B2 | 8/2015 | Beaudoin |
| 9,180,900 | B2 | 11/2015 | Ouellette |
| 9,499,189 | B2 | 11/2016 | Laurence et al. |
| 9,533,737 | B2 | 1/2017 | Beaudoin |
| 2006/0090939 | A1 | 5/2006 | White |
| 2006/0151983 | A1 * | 7/2006 | Despres .................. B62B 13/18 280/767 |
| 2015/0210133 | A1 | 7/2015 | Lacombe |
| 2015/0314800 | A1 | 11/2015 | Laurence et al. |

FOREIGN PATENT DOCUMENTS

| | | | |
|---|---|---|---|
| CA | 2250393 | A1 | 12/1998 |
| CA | 2256846 | A1 | 6/2000 |
| CA | 2264374 | A1 | 9/2000 |
| CA | 2290901 | A1 | 5/2001 |
| CA | 2442606 | C | 6/2009 |
| CA | 2647375 | A1 | 6/2010 |
| CA | 2531823 | C | 7/2010 |
| CA | 2513767 | C | 3/2012 |
| CA | 2724925 | C | 8/2012 |
| CA | 2755044 | C | 8/2012 |
| CA | 2840933 | A1 | 7/2015 |
| CA | 2871968 | A1 | 7/2015 |
| WO | 2004002811 | A1 | 1/2004 |

OTHER PUBLICATIONS

Machine-generated English abstract of CA2256846A1; translated by the EPO/GOOGLE on May 2, 2017.
Machine-generated English abstract of CA2264374A1; translated by the EPO/GOOGLE on May 2, 2017.
Machine-generated English abstract of CA2290901A1; translated by the EPO/GOOGLE on May 2, 2017.
Machine-generated English abstract of CA2647375A1; translated by the EPO/GOOGLE on May 2, 2017.
English abstract of CA2724925C; retrieved from https://worldwide.espacenet.com/ on May 2, 2017.
Machine-generated English abstract of CA2755044C; translated by the EPO/GOOGLE on May 2, 2017.
English abstract of CA2840933A1; retrieved from https://worldwide.espacenet.com/ on May 2, 2017.

* cited by examiner

SNOWMOBILE SKI ASSEMBLY

CROSS-REFERENCE

The present application claims priority to U.S. Provisional Patent Application No. 62/327,675 filed on Apr. 26, 2016, the entirety of which is incorporated herein by reference.

TECHNICAL FIELD

The present technology relates to snowmobile ski assemblies.

BACKGROUND

Snowmobiles skis are typically provided with keels extending below to aid in steering of the snowmobile. For instance, deeper keels are desired for aggressive riding of the snowmobile or when the riding surface is covered with soft-packed snow, while shallower keels are desired when the riding surface is covered with hard-packed snow or ice. To help prevent wear of the keels of the skis and to assist in steering on hard-packed snow or ice, metallic ski runners are usually provided against the bottom of the keels. Some snowmobile ski assemblies provide adjustable ski runners where the height of the ski runners can be selected depending on the conditions of the riding surface.

However, when the snowmobile is ridden on a surface that is not covered with snow or ice, such as asphalt, concrete or wood, a portion of the weight of the snowmobile is applied to the keel and/or the ski runner of the skis, thus making the steering of the snowmobile less responsive for the rider. Riding on such surfaces may prematurely wear the bottom surface of the keel and/or the ski runner of the skis.

Therefore, there is a desire for a ski assembly for a snowmobile that can be adjusted for operation of the snowmobile in different riding conditions while not causing premature wear when riding on surfaces that are not covered with snow or ice.

SUMMARY

One object of the present technology is to ameliorate at least some of the inconveniences of the prior art.

According to one aspect of the present technology, there is provided a snowmobile ski assembly including a ski having a bottom, at least one wheel rotatably connected to the ski and the at least one wheel having a lower portion extending below the bottom of the ski. The snowmobile ski assembly has a ski runner being operatively connected to the ski, the ski runner being movable relative to the ski between a first position and a second position, a bottom of the ski runner being above the lower portion of the at least one wheel when the ski runner is in the first position, and the bottom of the ski runner being below the lower portion of the at least one wheel when the ski runner is in the second position.

In some implementations, the snowmobile ski assembly also has a ski runner adjustment assembly connected to the ski runner, the ski runner adjustment assembly selectively moving the ski runner between the first and second positions.

In some implementations, the bottom of the ski runner is closer to the bottom of the ski in the first position than in the second position.

In some implementations, the ski defines a slot, and the ski runner is disposed in the slot.

In some implementations, the at least one wheel is laterally aligned with a longitudinal centerline of the ski.

In some implementations, the ski has a central keel, and the lower portion of the at least one wheel extends below the central keel of the ski.

In some implementations, the ski has an external keel. The external keel is laterally offset from a longitudinal centerline of the ski, and the lower portion of the at least one wheel extends below the external keel of the ski.

In some implementations, the ski pivots about a laterally extending ski pivot axis. The ski runner adjustment assembly is connected about the ski pivot axis, and the ski pivots about the ski pivot axis relative to the ski runner adjustment assembly.

In some implementations, the ski pivots about a laterally extending ski pivot axis. The at least one wheel includes a front wheel rotatably connected to the ski forward of the ski pivot axis, and a rear wheel rotatably connected to the ski rearward of the ski pivot axis.

In some implementations, the rear wheel is rotatably connected to the ski rearward of the ski runner.

In some implementations, the lower portions of the front and rear wheels extend below a central keel of the ski.

In some implementations, the ski has an external keel. The external keel is laterally offset from a longitudinal centerline of the ski, and lower portions of the front and rear wheels extend below the external keel of the ski.

In some implementations, the front wheel is rotatably connected to the ski via a front wheel frame, and the rear wheel is rotatably connected to the ski via a rear wheel frame.

In some implementations, the front wheel frame and the rear wheel frame define a portion of a central keel of the ski.

In some implementations, the front wheel frame is received in the ski in a front slot, and the rear wheel frame is received in the ski in a rear slot.

In some implementations, the front wheel frame has a front ski adapter and a front wheel adapter. The front ski adapter connects the front wheel adapter to the ski. The front wheel is rotatably connected to the front wheel adapter. The rear wheel frame has a rear ski adapter and a rear wheel adapter. The rear ski adapter connects the rear wheel adapter to the ski. The rear wheel is rotatably connected to the rear wheel adapter.

In some implementations, the front wheel adapter is received inside the front ski adapter, and the rear wheel adapter is received inside the rear ski adapter.

In some implementations, the ski has a handle connected to an upturned front portion of the ski.

In some implementations, the at least one wheel includes a front wheel rotatably connected to the ski forward of the slot and a rear wheel rotatably connected to the ski rearward of the slot. The front wheel is rotatably connected to the ski via a front wheel frame. The front wheel frame has a front slot adapted for receiving a front portion of the ski runner. The rear wheel is rotatably connected to the ski via a rear wheel frame. The rear wheel frame has a rear slot adapted for receiving a rear portion of the ski runner.

For the purposes of the present application, terms related to spatial orientation such as forward, rearward, front, rear, upper, lower, left, and right, are as they would normally be understood by a rider of the snowmobile sitting thereon in a normal driving position with the snowmobile being upright and steered in a straight ahead direction.

Should there be any difference in the definitions of term in this application and the definition of these terms in any document included herein by reference, the terms as defined in the present application take precedence.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
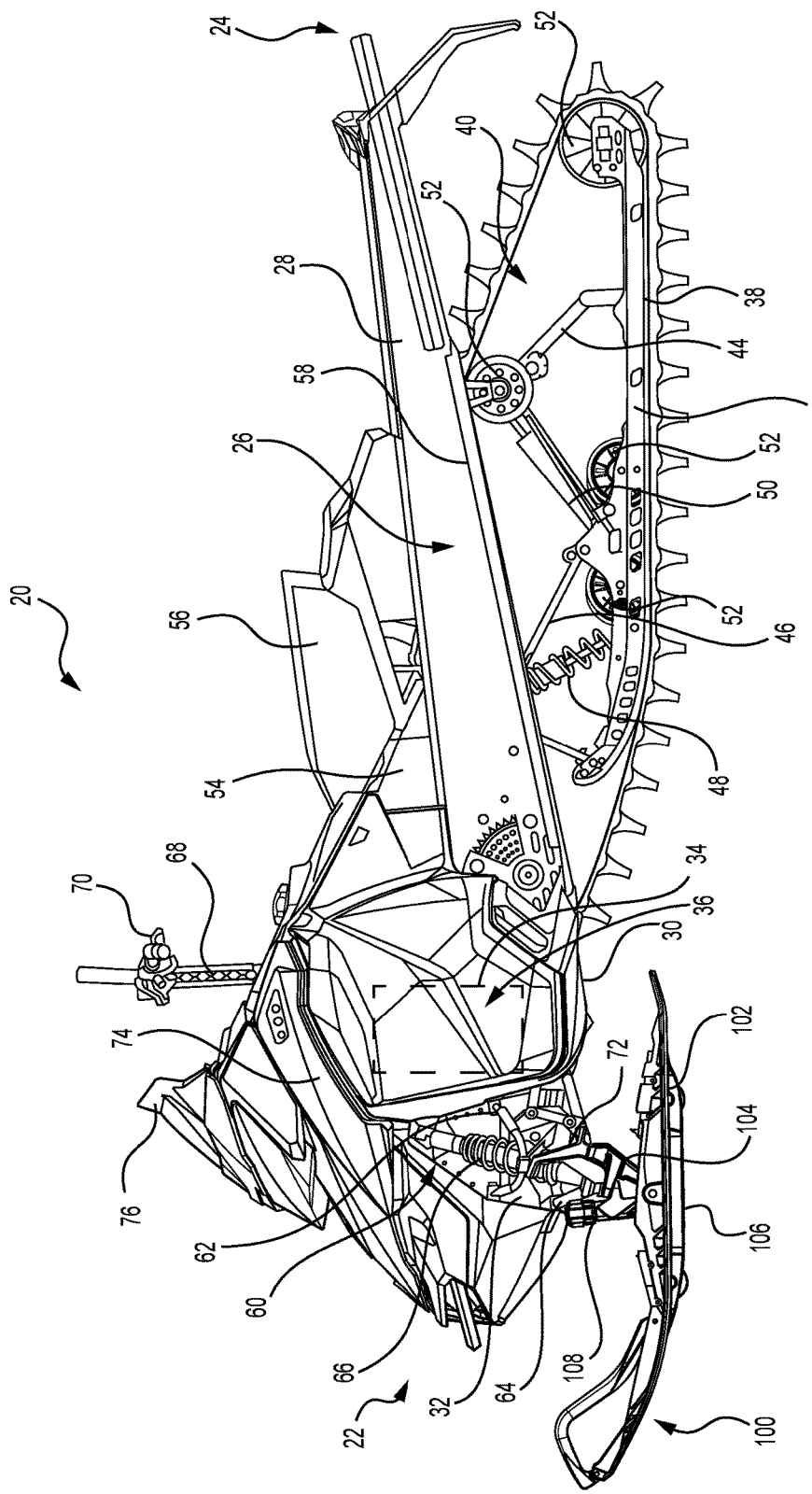
FIG. 1 is a left side elevation view of a snowmobile.

With reference to FIG. 1, a snowmobile 20 will be described. Although a snowmobile 20 is presented herein, it is contemplated that aspects of the present technology could be applied to other types of vehicles having skis for operation on snow.

The snowmobile 20 has a front end 22 and a rear end 24, which are defined consistently with the forward travel direction of the snowmobile 20. The snowmobile 20 includes a frame 26. The frame 26 includes a tunnel 28, a motor cradle portion 30 and a front suspension assembly portion 32. A motor 34, which is schematically illustrated in FIG. 1, is supported by the motor cradle portion 30. In the present implementation, the motor 34 is a two-stroke, two-cylinder, internal combustion engine. However, it is contemplated that other types of motors could be used such as, but not limited to, an electric motor or a four-stroke internal combustion engine. The engine 34 powers an electrical system 36 of the snowmobile 20, the electrical system 36 being also schematically illustrated in FIG. 1.

An endless drive track 38 is disposed under the tunnel 28. The endless drive track 38 is operatively connected to the engine 34 through a continuously variable transmission (CVT, not shown). The endless drive track 38 is suspended for movement relative to the frame 26, by a rear suspension assembly 40. The rear suspension assembly 40 includes a pair of spaced apart slide rails 42, rear suspension arms 44, 46 and shock absorbers 48, 50. The slide rails 42 engage the inner side of the endless drive track 38. The rear suspension arms 44, 46 and the shock absorbers 48, 50 pivotally connect the tunnel 28 to the slide rails 42. The endless drive track 38 is driven to run about the rear suspension assembly 40 for propulsion of the snowmobile 20. A plurality of rollers 52 define the path over which the endless drive track 38 travels.

A fuel tank 54 is supported on top of the tunnel 28. A seat 56 is disposed on the fuel tank 54 and is adapted to support a rider. Two footrests 58 (only one of which is shown) are positioned on opposite sides of the tunnel 28 below the seat 56 to support the rider's feet. The footrests 58 are integrally formed with the tunnel 28.

Left and right ski assemblies 100 are positioned at a front of the snowmobile 20 (only the left one being shown in FIG.

1). Each ski assembly 100 includes a ski 102, a corresponding ski leg 104 and other components that will be described in greater detail below. Each ski assembly 100 is attached to the front suspension assembly portion 32 of the frame 26 via a front suspension assembly 60. Each front suspension assembly 60 includes an upper A-arm 62, a lower A-arm 64 and a shock absorber 66. Each ski leg 104 is pivotally connected to its corresponding upper and lower A-arms 62, 64 and the corresponding shock absorber 66 is connected between the lower A-arm 64 and the front suspension assembly portion 32 of the frame 26. It is contemplated that other types of front suspension assemblies could be used. It is contemplated that the snowmobile 20 could have only one ski assembly 100.

Figure 13:
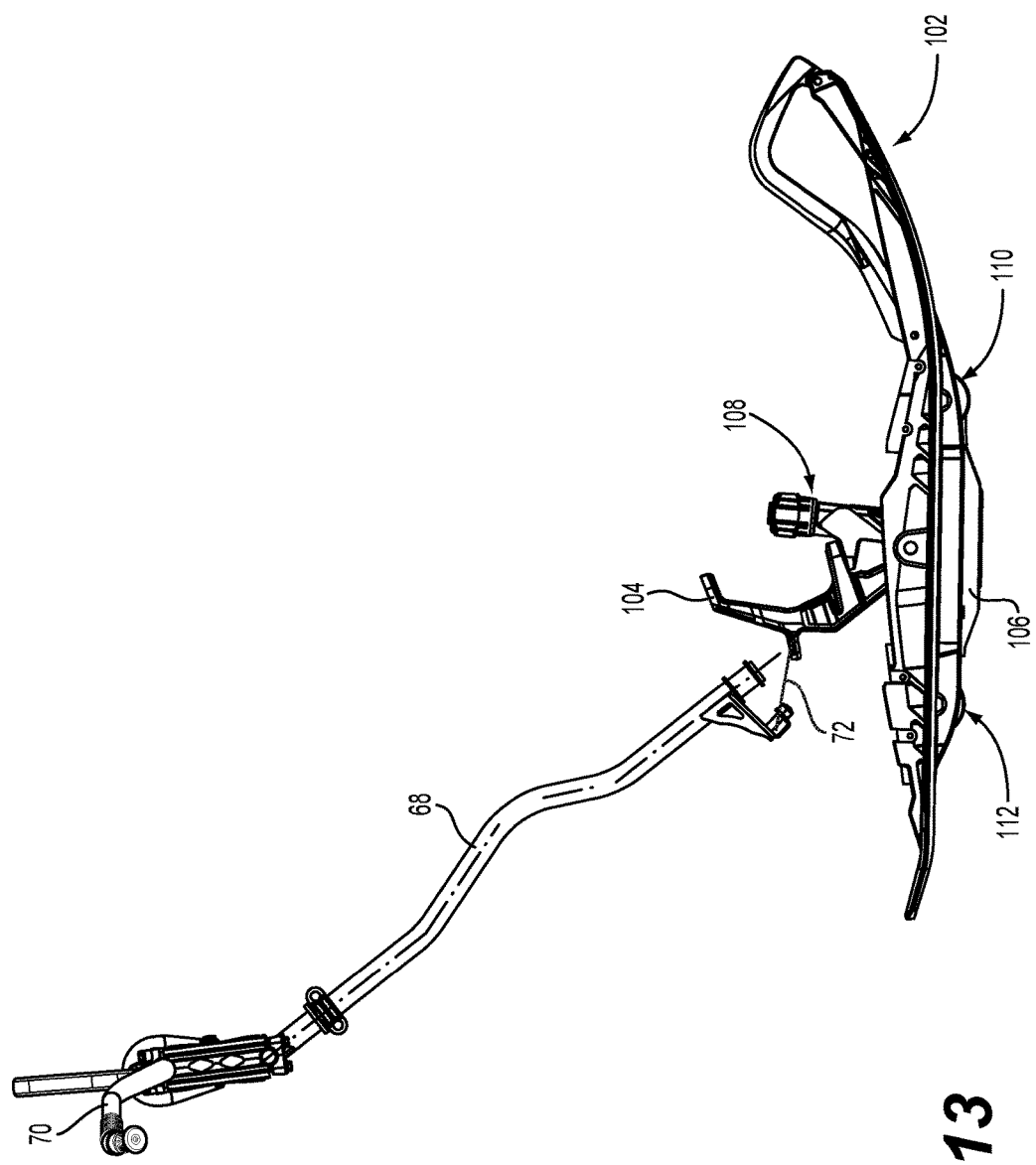
FIG. 13 is a right side elevation view of the ski assembly of FIG. 9, with a portion of a steering assembly.
Figure 14:
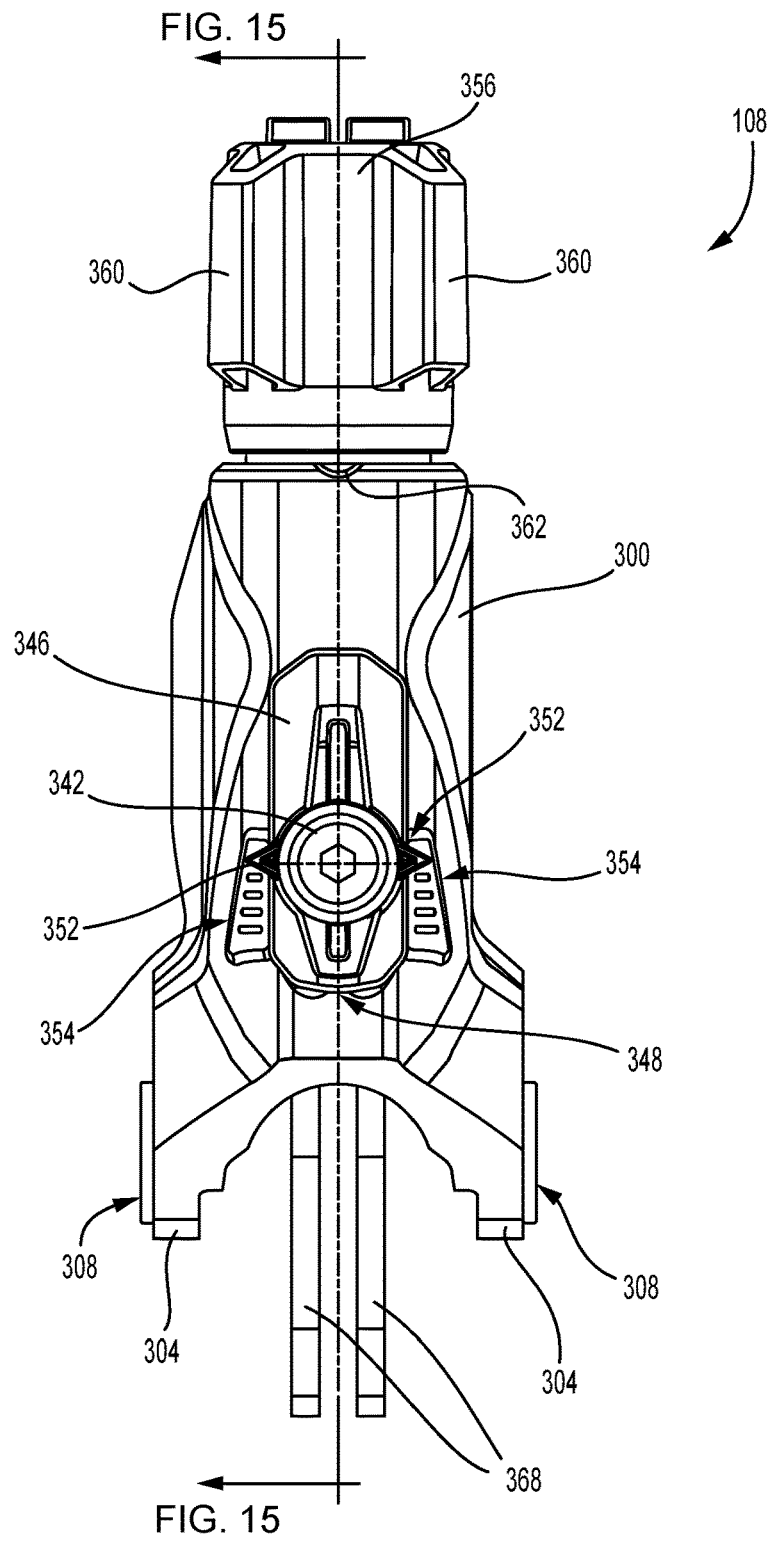
FIG. 14 is a front elevation view of the ski runner adjustment assembly of the ski assembly of FIG. 2.

Referring to FIGS. 1 and 13, a steering assembly including a steering column 68 and a handlebar 70 is supported by the frame 26. The steering column 68 is attached at its upper end to the handlebar 70, which is positioned forward of the seat 56. The steering column 68 is operatively connected to the ski legs 104 by steering rods 72 in order to steer the skis 102, and thereby the snowmobile 20, when the handlebar 70 is turned.

Figure 28:
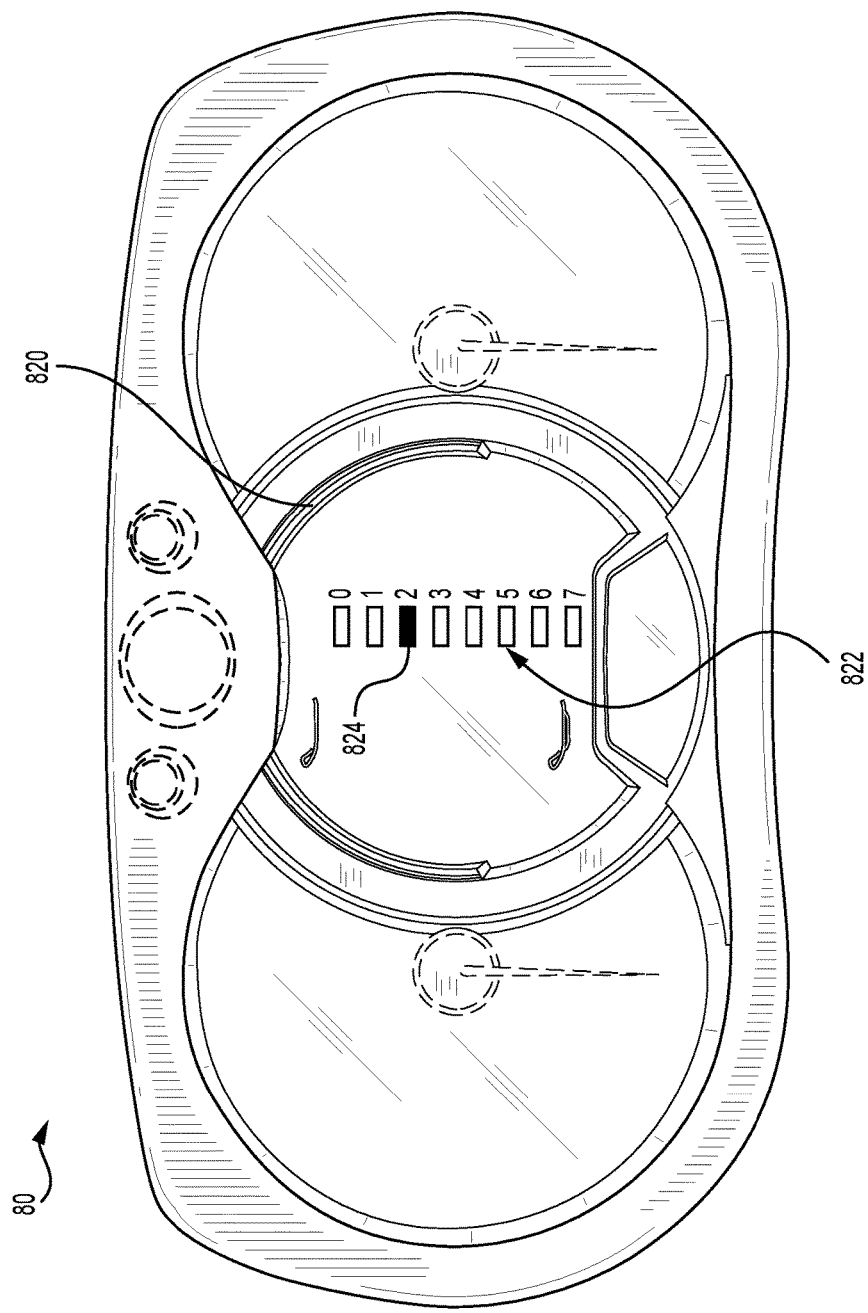
FIG. 28 is a rear plan view, of an implementation of the indicator of FIG. 22.

A display cluster 80 (a portion of which is shown in FIG. 28) is provided in front of the seat 56 to display information, such as the vehicle speed, engine speed, vehicle mode, temperature and the like, to the driver of the snowmobile 20. The display cluster 80 includes one or more gauges, display screens, indicator lights and sound output devices such as speakers, alarms and the like.

Referring to FIG. 1, fairings 74 enclose the engine 34, the electrical system 36 and the CVT, thereby providing an external shell that protects the engine 34, the electrical system 36 and the CVT. The fairings 74 include a hood and one or more side panels that can be opened to allow access to the engine 34, the electrical system 36 and the CVT when this is required, for inspection or maintenance of the engine 34, the electrical system 36 and/or the CVT for example. A windshield 76 is connected to the fairings 74 forward of the handlebar 70. It is contemplated that the windshield 76 could be attached directly to the handlebar 70.

Turning now to FIGS. 2 to 15, the left and right ski assembly 100 of the snowmobile 20 will be described in more detail. Alternative implementations of the ski assembly will be described with reference to FIGS. 16 to 20. The left ski assembly 100 includes the left ski 102, the left ski leg 104, a left ski runner 106 and a left ski runner adjustment assembly 108. In the right ski assembly 100, the right ski 102, the right ski runner 106 and the right ski runner adjustment assembly 108 are identical to those of the left ski assembly 100, and the right ski 100 and the right ski leg 104 are a mirror image of the left ski leg 104. Accordingly, for simplicity, the components of the left and right ski assembly 100 will be described at once for both ski assemblies 100, unless mentioned otherwise. The ski runner adjustment assembly 108 that is shown in FIGS. 1 to 15 is in accordance with an implementation of a ski runner adjustment assembly described in US 2015/0314799 A1 published Nov. 5, 2015, which is incorporated herein by reference in its entirety. It is contemplated that other implementations of a ski runner adjustment assembly could be used, such as the alternative implementations described in US 2015/0314799 A1. It is contemplated that the left and right ski legs 104 could be identical, or that the left and right ski legs 104 could have features that differ from each other. It is contemplated that one or more of the right ski 102, the right ski runner 106 and the right ski runner adjustment assembly 108 could be a mirror image of those of the left ski assembly 100 or could have one or more features that differ from those of the left ski assembly 100. It is contemplated that in some implementations of the ski assembly 100, such as in a replacement ski assembly for replacing an existing ski of a snowmobile 20, the ski leg 104 could be omitted as a suitable ski leg 104 may already be provided on the snowmobile 20.

Figure 9:
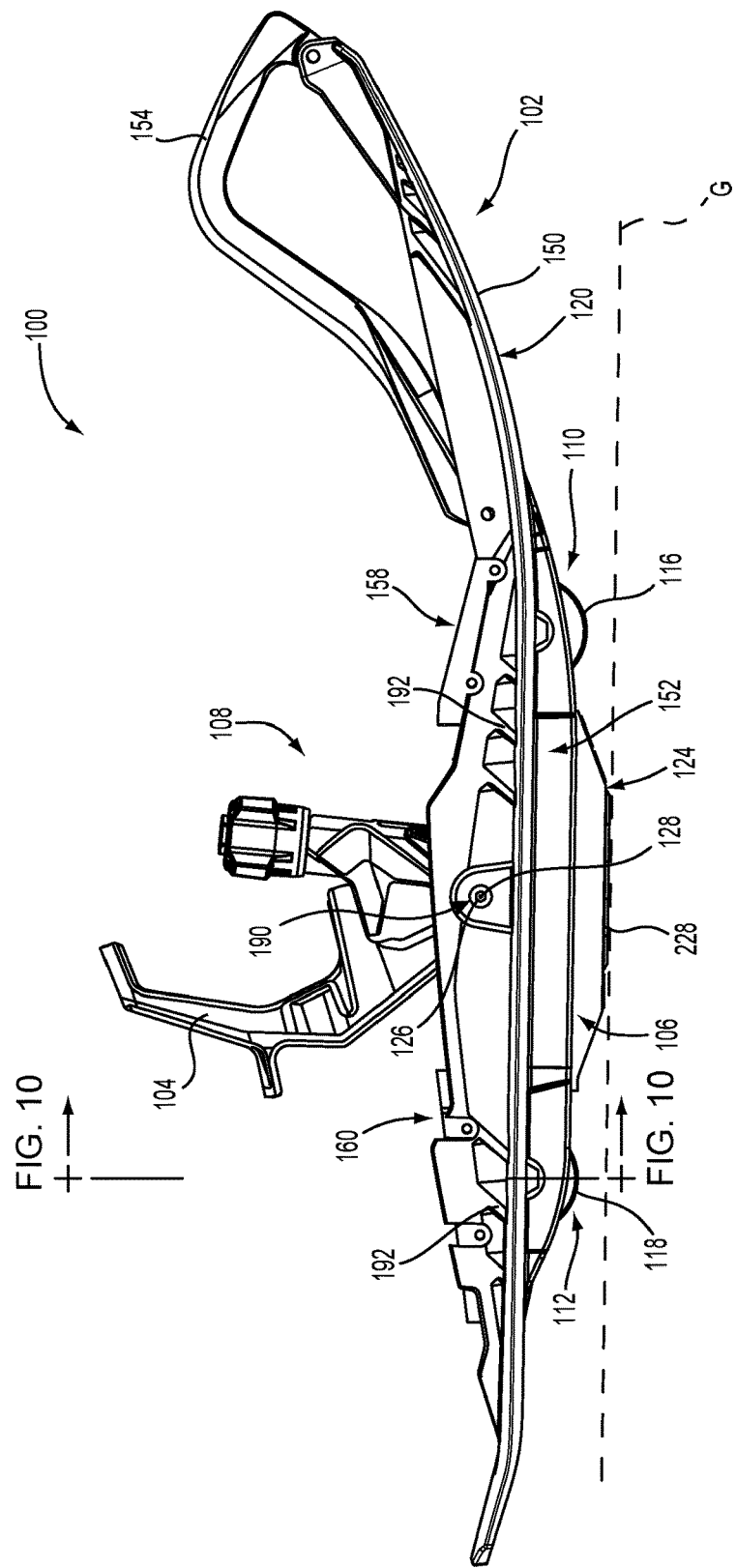
FIG. 9 is a right side elevation view of the ski assembly of FIG. 2, with the ski runner in a lowered position.
Figure 10:
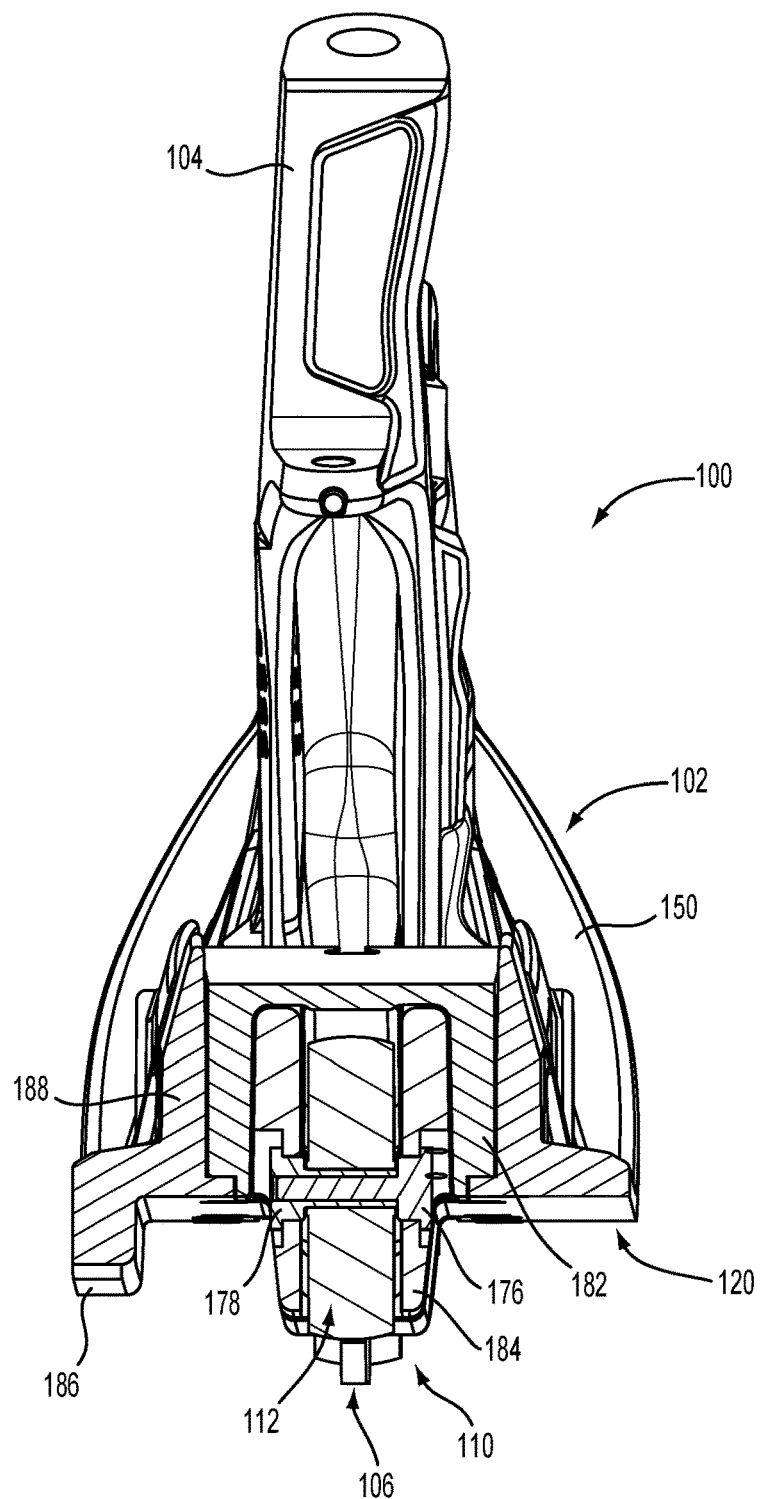
FIG. 10 is a cross-sectional view of the ski assembly of FIG. 9 taken along cross-section line 10-10 of FIG. 9.

Referring to FIGS. 1 to 15, the ski assembly 100 includes a front wheel 110 and a rear wheel 112. The front wheel 110 has a lower portion 116 and the rear wheel has a lower portion 118. Both lower portions 116, 118 extend below a bottom 120 of the ski 102. In the ski assembly 100, the ski runner 106 is operatively connected to the ski 102 via the ski runner adjustment assembly 108. The ski runner adjustment assembly 108 is used to move the ski runner 106 inside a slot 122 (FIG. 12) defined in the ski 102 to change an amount by which the ski runner 106 extends below the ski 102. By changing the amount by which the ski runner 106 extends below the ski 102, the ski assembly 100 can be adjusted for different riding conditions. When the ski runner 106 is moved to a raised position, as shown in FIGS. 2 to 6, a bottom 124 of the ski runner 106 extends above the lower portions 116, 118 of the front and rear wheels 110, 112 respectively. When the ski runner 106 is moved to a lowered position as shown in FIGS. 9 to 11, the bottom 124 of the ski runner 106 extends below the lower portions 116, 118 of the front and rear wheels 110, 112 respectively.

Referring to FIGS. 2, 6, 9 and 11, the ski 102 is pivotally connected to a bottom of the ski leg 104 by a bolt 126, or another fastener such as a rivet for example. The bolt 126 defines a laterally extending ski pivot axis 128 about which the ski 102 pivots relative to the ski leg 104. The ski runner adjustment assembly 108 is connected to the bolt 126 at the ski pivot axis 128 and to the ski leg 104. As such, the ski 102 pivots about the ski pivot axis 128 relative to the ski runner adjustment assembly 108. The slot 122 defined in the ski 102, in which the ski runner 106 is disposed, stabilizes the ski runner 106 laterally and prevents rotation of the ski runner 106 relative to the ski 102 while allowing the ski runner 106 to move therein.

Figure 2:
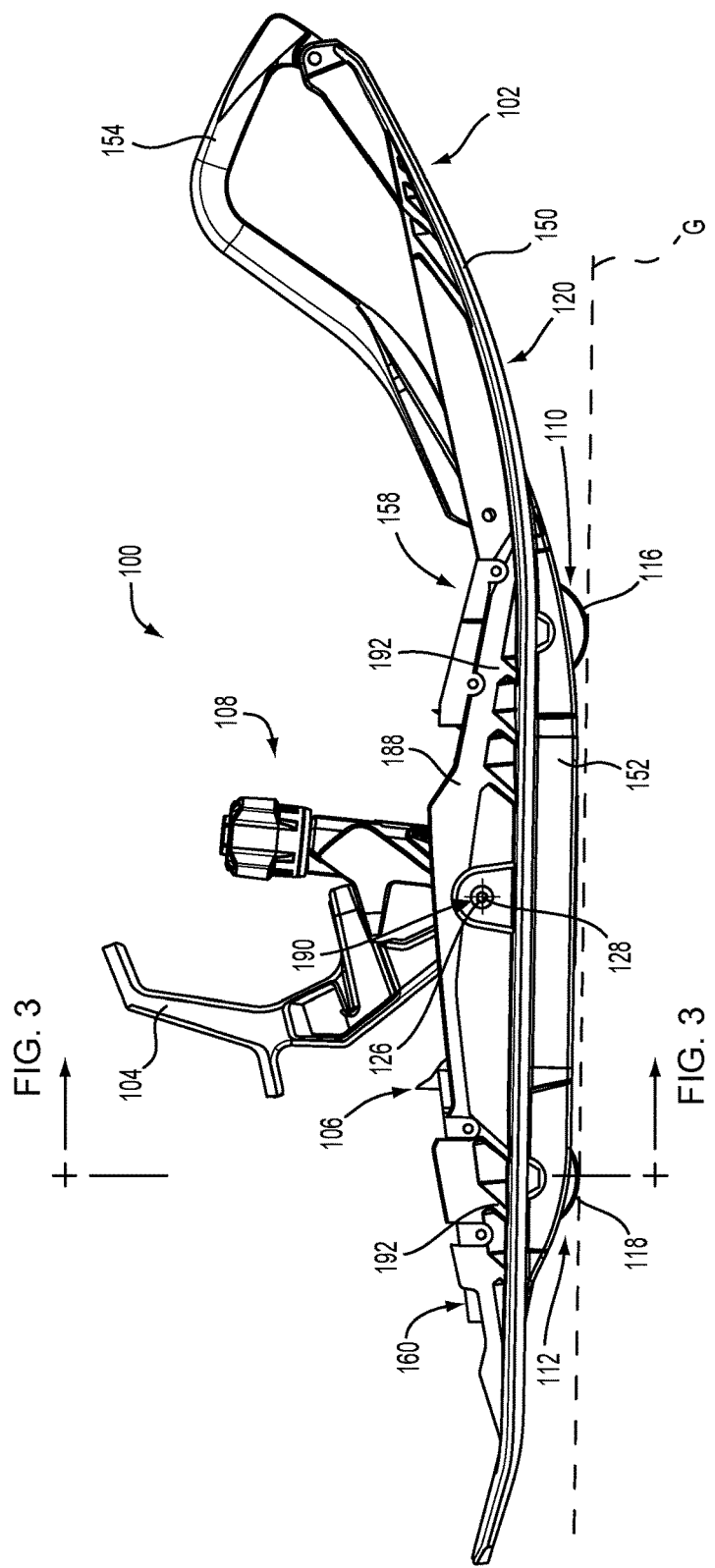
FIG. 2 is a right side elevation view of a left ski assembly of the snowmobile of FIG. 1, with a ski runner in a raised position.
Figure 3:
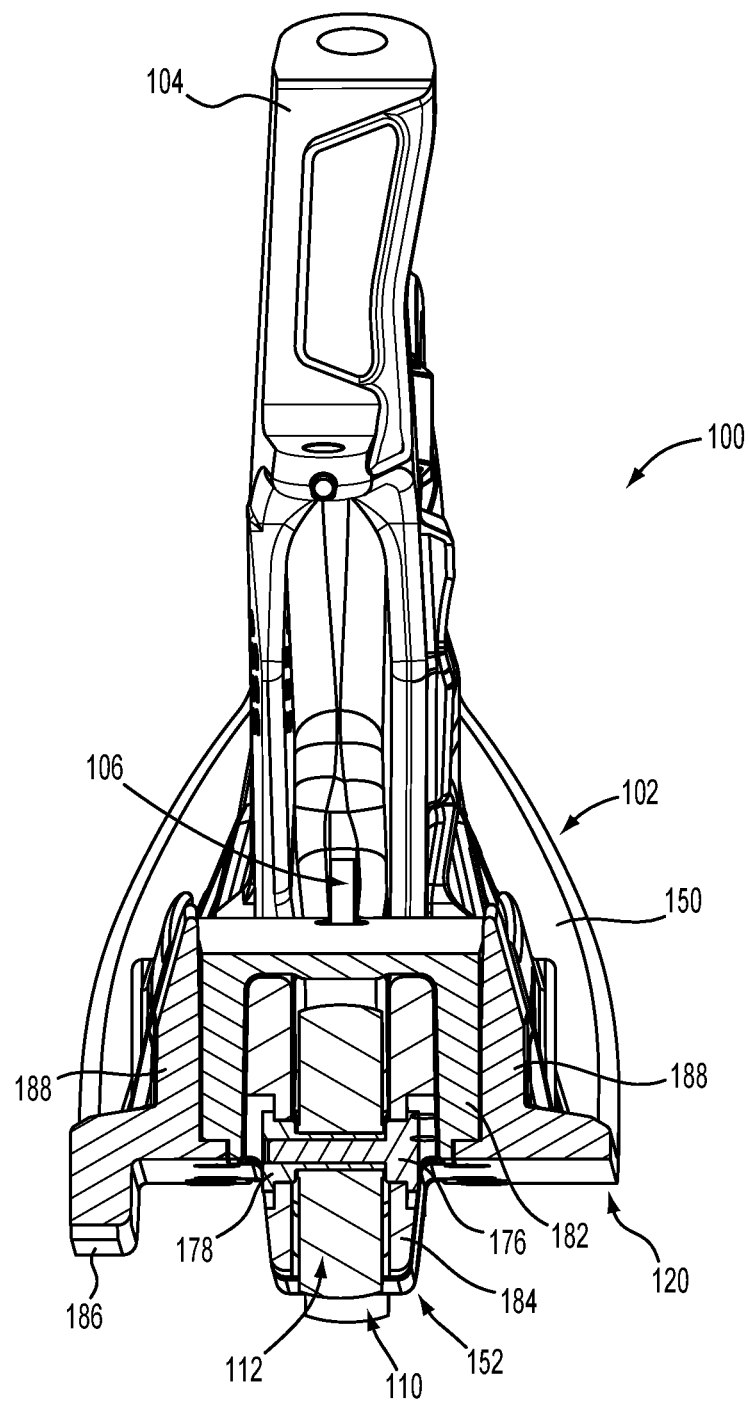
FIG. 3 is a cross-sectional view of the ski assembly of FIG. 2 taken along cross-section line 3-3 of FIG. 2.
Figure 4:
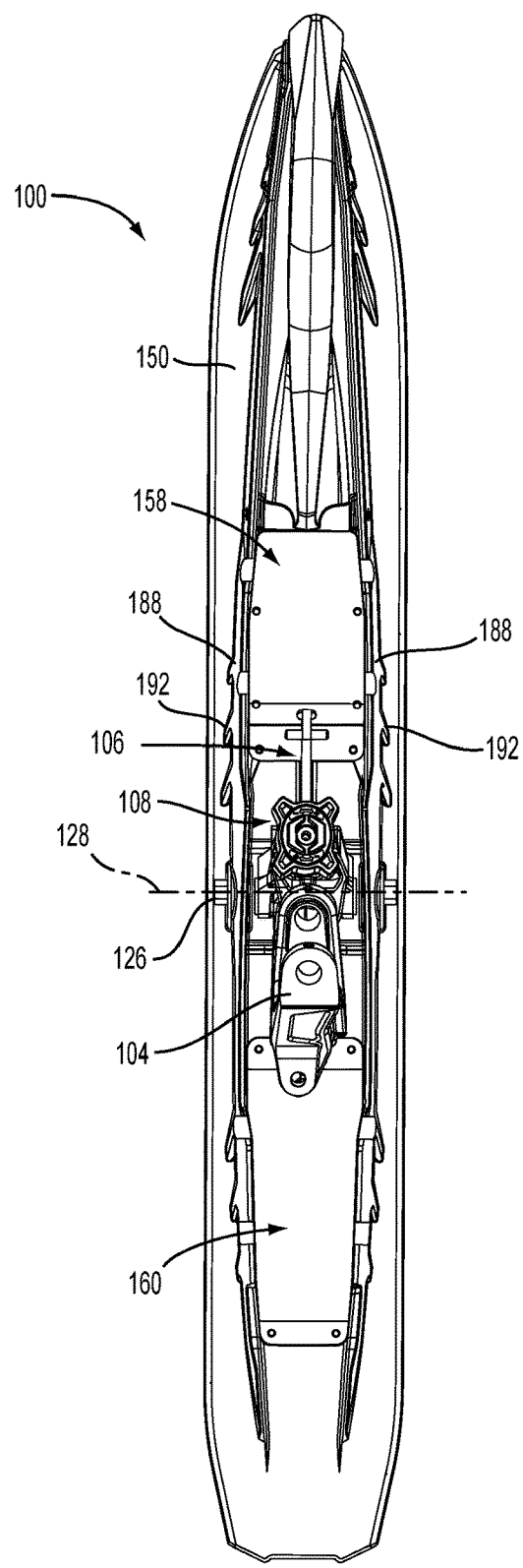
FIG. 4 is a top plan view of the ski assembly of FIG. 2.

The only vertical load-bearing connection between the ski runner 106 and the ski leg 104 is provided via the ski runner adjustment assembly 108 as the ski runner 106 is not connected directly to the ski 102. As such, the ski 102 only bears a vertical load when at least one of the bottom 120 of the ski, the front wheel 110 and the rear wheel 112 is in contact with the surface on which the snowmobile 20 rides. As can be seen in FIG. 2 where the ski runner 106 is in the raised position, when the snowmobile 20 is disposed on flat, level ground G, such as when riding on asphalt, concrete or wood, the ski assembly 100 is supported on the ground G by the front wheel 110 and the rear wheel 112. Under these conditions, a portion of the weight of the snowmobile 20 results in a force passing through the ski leg 104, the ski 102, the front wheel 110, and the rear wheel 112 to the ground G without passing through the ski runner adjustment assembly 108 and the ski runner 106. As can be seen in FIG. 9 where the ski runner 106 is in the lowered position, when the snowmobile 20 is disposed on flat, level ground G, such as when riding on an icy level surface, the ski assembly 100 is supported on the ground G by the ski runner 106 as the bottom 120 of the ski 102, the front wheel 110 and the rear wheel 112 are spaced from the ground G. Under these conditions, a portion of the weight of the snowmobile 20 results in a force passing through the ski leg 104, the ski runner adjustment assembly 108 and the ski runner 106 to the ground G without passing through the ski 102.

Figure 6:
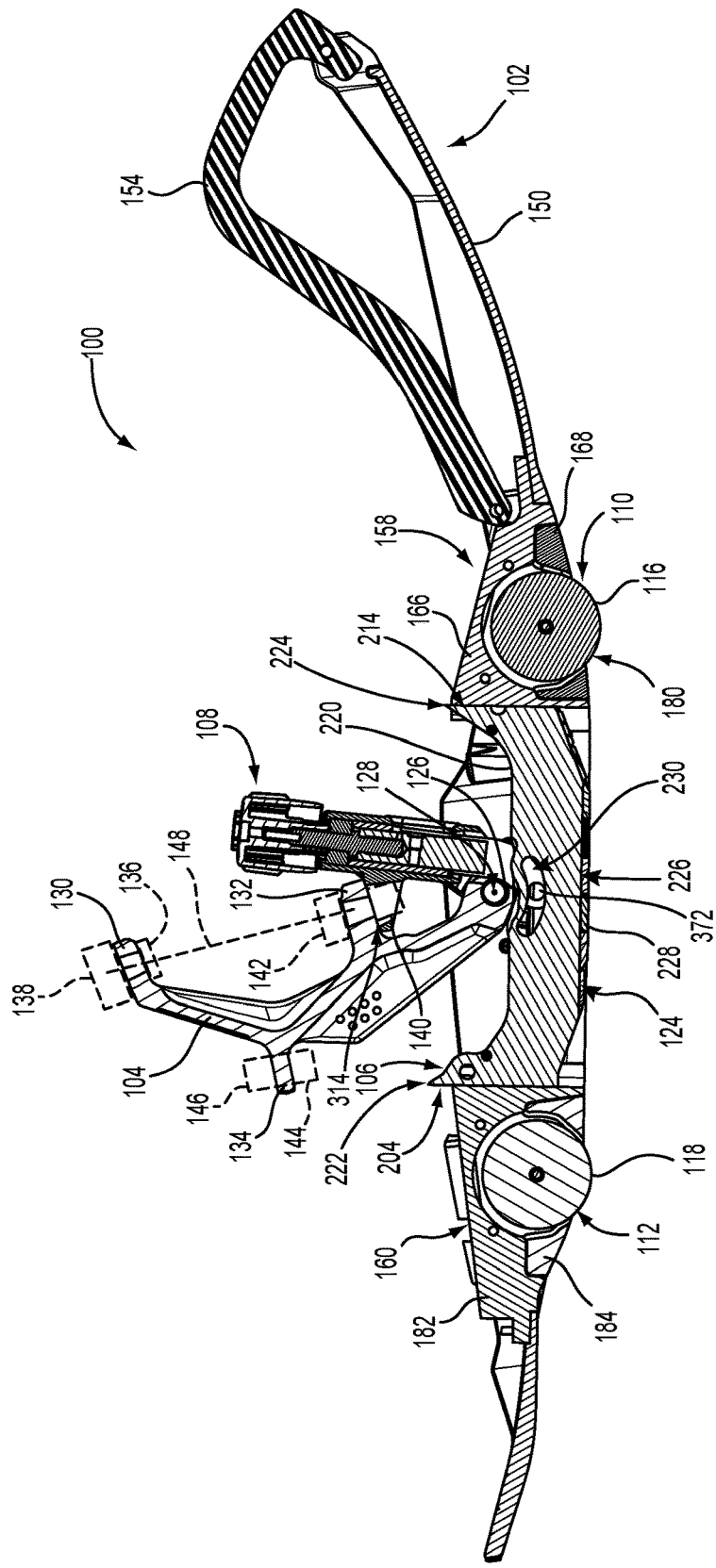
FIG. 6 is a cross-sectional view of the ski assembly of FIG. 2 taken along cross-section line 6-6 of FIG. 5.
Figure 11:
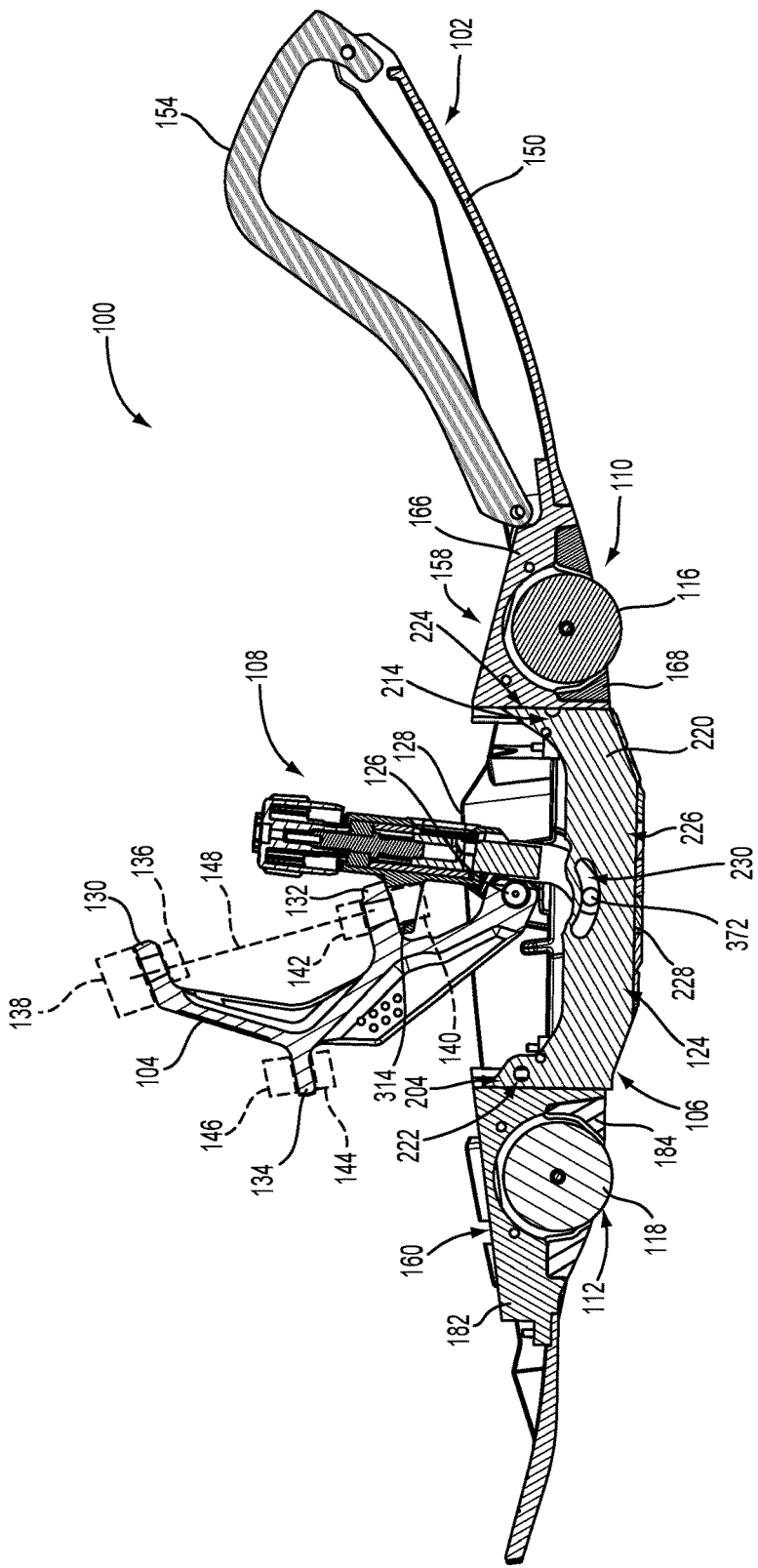
FIG. 11 is a cross-sectional view of the ski assembly of FIG. 9 taken along cross-section line 6-6 of FIG. 5, with the ski runner in a lowered position.

With reference to FIGS. 6 and 11, the ski leg 104 has an upper front tab 130, a lower front tab 132, and a rear tab 134. A ball joint 138 (shown in dotted lines) is connected to the upper front tab 130 by a nut 136 (shown in dotted lines) to connect the ski leg 104 to the end of the upper A-arm 62. A ball joint 142 (shown in dotted lines) is connected to the lower front tab 132 by a nut 140 (shown in dotted lines) to connect the ski leg 104 to the end of the lower A-arm 64. A ball joint 146 (shown in dotted lines) is connected to the rear tab 134 by a nut 144 (shown in dotted lines) to connect the ski leg 104 to the end of the steering rod 72. When the rider of the snowmobile 20 turns the handlebar 70, the steering rod 72 pushes or pulls, as the case may be, on the rear tab 134. As a result, the ski leg 104 pivots about a ski leg pivot axis 148 passing through the centers of the ball joints 138, 142.

Figure 5:
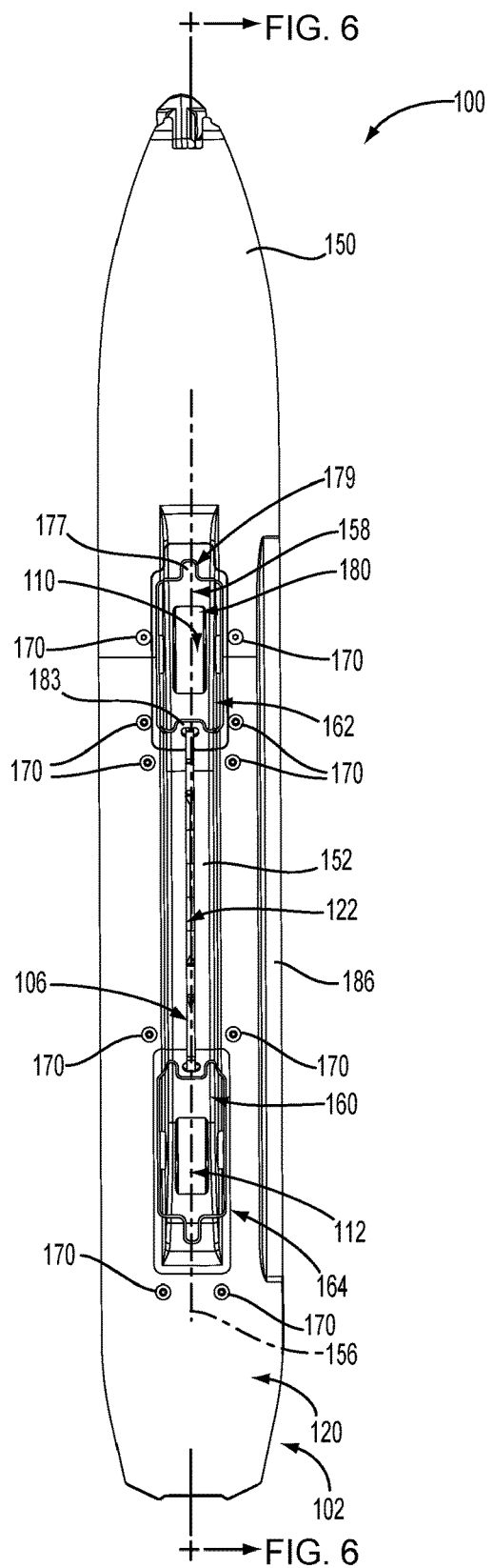
FIG. 5 is a bottom plan view of the ski assembly of FIG. 2.
Figure 12:
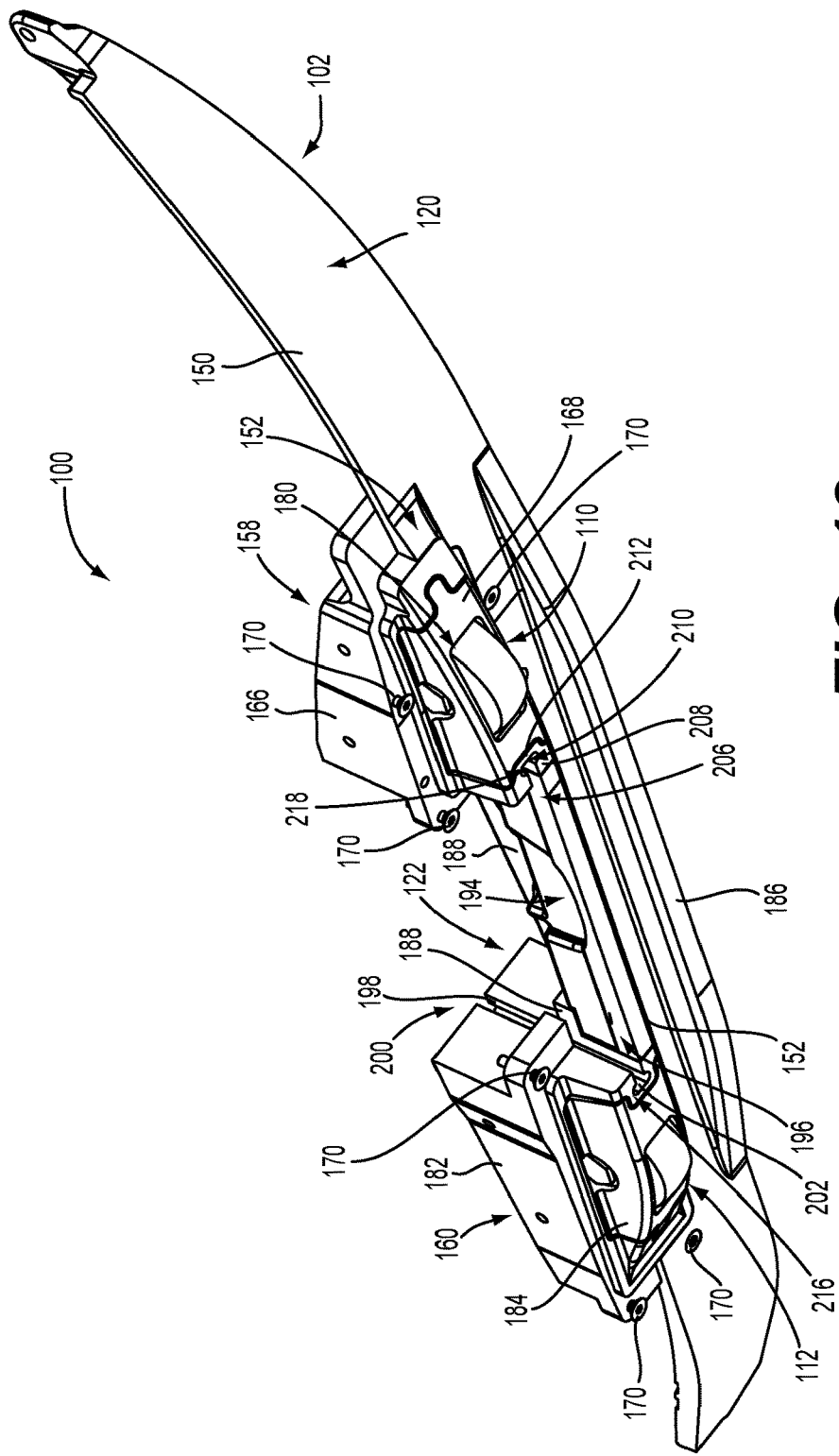
FIG. 12 is a partial cross-sectional view taken from a bottom, right front side of the ski assembly of FIG. 2, with the ski runner and a ski runner adjustment assembly omitted.

With reference to FIGS. 2, 3, 9, 10 and 12, the ski 102 has a ski body 150. The ski body 150 includes a central keel 152 provided on the bottom 120 of the ski body 150 and a handle 154 connected to the upturned front portion of the ski body 150. The central keel 152 is positioned inline with a longitudinal centerline 156 of the ski body 150. A portion of the central keel 152 is formed by a front wheel frame 158 and a rear wheel frame 160, as shown in FIG. 12. The front wheel 110 is rotatably connected to the ski body 150 through the front wheel frame 158 and the rear wheel 112 is rotatably connected to the ski body 150 through the rear wheel frame 160. As shown in FIG. 5, the front wheel frame 158 is received in a front slot 162 and the rear wheel frame 160 is received in a rear slot 164; both being defined in the ski body 150. Referring to FIGS. 5 and 12, the front wheel frame 158 can only be inserted in the front slot 162 in a unique fashion and the rear wheel frame 160 can only be inserted in rear slot 164 in another unique fashion as the front and rear slots 162, 164 differ in shape and the front wheel frame 158 and the rear wheel frame 160 respectively have a corresponding shape. This feature prevents the front wheel frame 158 from being inserted in the front slot 162 in a wrong way, and prevents the front wheel frame 158 from being inserted in the rear slot 164, and vice-versa.

Figure 7:
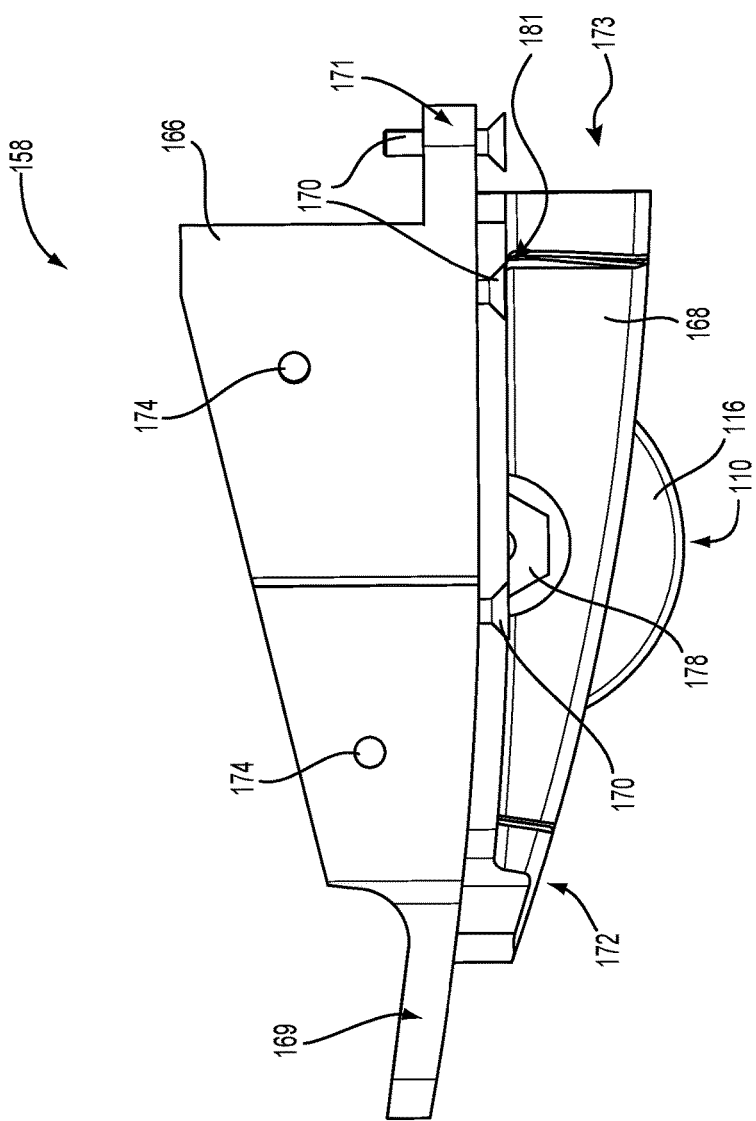
FIG. 7 is a left side elevation view of a front wheel frame and a front wheel of the ski assembly of FIG. 2.
Figure 8:
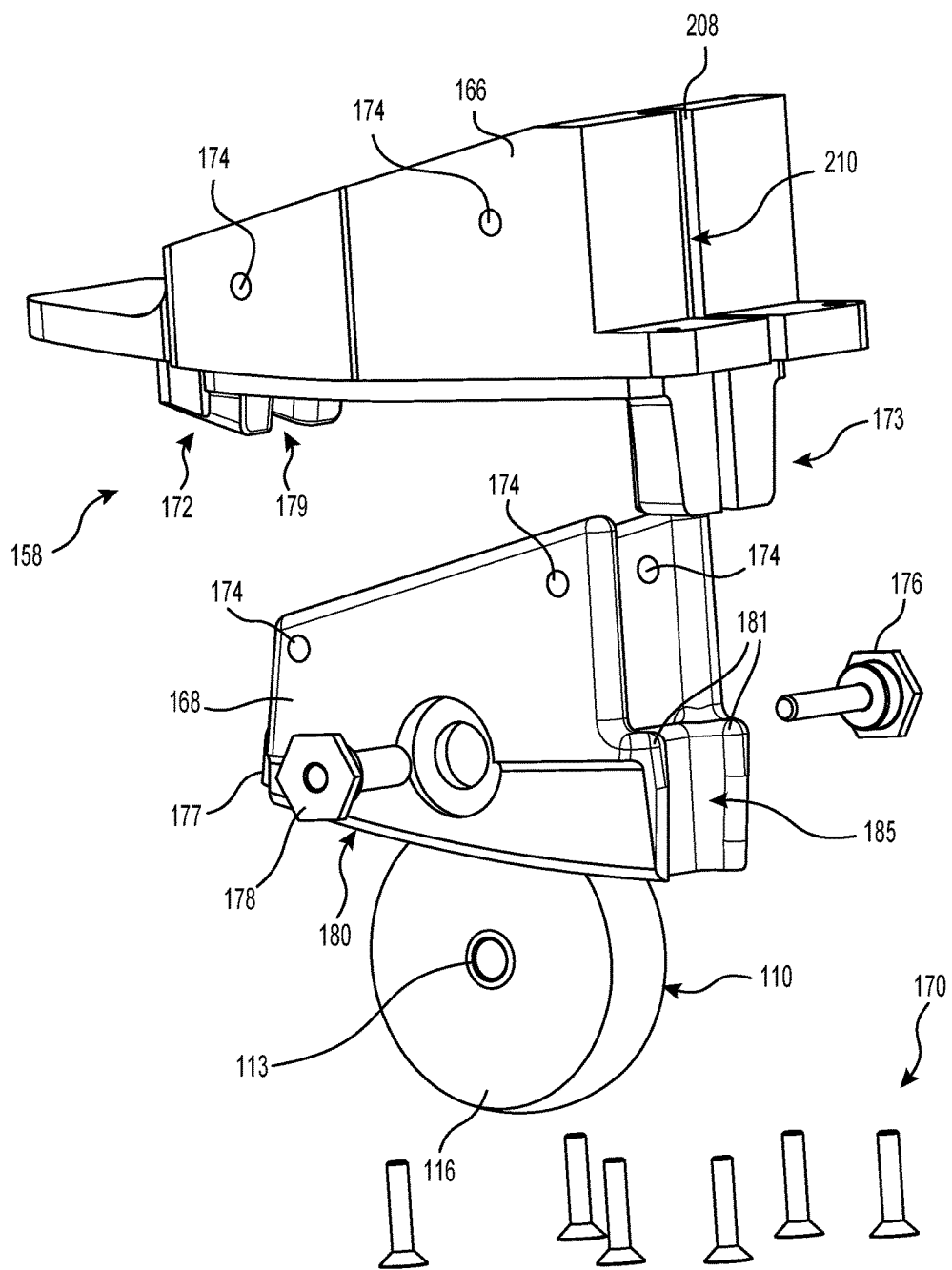
FIG. 8 is an exploded, left rear side perspective view of the front wheel frame and the front wheel of FIG. 7.

Referring to FIGS. 5, 7 and 8, the front wheel frame 158 will be described in more detail. The front wheel frame 158 includes a front ski adapter 166 and a front wheel adapter 168.

The front ski adapter 166 has front and rear flanges 169, 171 respectively. The front and rear flanges 169, 171 are configured to sit on top of the ski body 150. The front ski adapter 166 connects to the ski body 150 through six fasteners 170 extending through the bottom 120 of the ski 102 and into the front ski adapter 166. The rear face of the front ski adapter 166 has a slot 210 which will be described below. The front ski adapter 166 has front and rear bottom protrusions 172, 173 respectively. The front and rear bottom protrusions 172, 173 match the width of the rear wheel frame 160. The front and rear bottom protrusions 172, 173 of the front ski adapter 166 and the rear wheel frame 160 form part of the central keel 152 of the ski body 150.

The front wheel adapter 168 is shaped to be received inside the front ski adapter 166. The front wheel adapter 168 connects to the front ski adapter 166 via fasteners (not shown) passing through holes 174 defined in both the front ski adapter 166 and the front wheel adapter 168. The front wheel adapter 168 has a tongue 177 (FIG. 5) protruding in the front face of the front wheel adapter 168. The tongue 177 is shaped to fit within a corresponding slot 179 defined on the bottom of the front ski adapter 166 by the front protrusion 172. Spaced apart shoulders 181 protrude on the rear face of the front wheel adapter 168. The shoulders 181 of the front wheel adapter 168 are configured to abut on corresponding shoulders (not shown) defined in the front ski adapter 166. The front ski adapter 166 has a protrusion 183 (FIG. 5) extending on the front face of the protrusion 173. The protrusion 183 is shaped to fit within a corresponding slot 185 (FIG. 8) defined between the shoulders 181 on the rear face of the front wheel adapter 168.

The front wheel 110 is inserted in the front wheel adapter 168 and is connected thereto using a male bolt 176 and a female bolt 178. The shank of the female bolt 178 forms the axle about which the front wheel 110 rotates. The front wheel adapter 168 has a bottom aperture 180 configured so that only the lower portion 116 of the front wheel 110 extends therethrough. As can be seen in FIG. 6, the length of the bottom aperture 180 is smaller than the diameter of the front wheel 110. Thus, when the front wheel 110 is connected to the front wheel adapter 168, infiltration and accumulation of snow, ice and/or water is reduced in the front wheel adapter 168. The front wheel 110 is inserted in the front wheel adapter 168 through the top of the front wheel adapter 168 before being connected thereto using the male and female bolts 176, 178 respectively, and before the front wheel adapter 168 is connected to the front ski adapter 166.

Referring to FIGS. 5 and 6, the rear wheel frame 160 is understood to have a configuration similar to the front wheel frame 158, i.e. the rear wheel frame 160 includes a rear ski adapter 182 and a rear wheel adapter 184. In addition, it can be seen in FIGS. 5 and 12 that the rear wheel frame 160 is connected to the ski body 150 using four fasteners 170 instead of six. It is contemplated that the front wheel frame 158 and the rear wheel frame 160 could be configured otherwise.

Referring to FIGS. 3, 5, 10 and 12, the ski body 150 further includes an external keel 186. The external keel 186 is disposed on the left side of the bottom 120 of the left ski 102. On the right ski 102, the external keel 186 is disposed on the right side of the bottom 120 of the ski 102. The ski body 150, the central keel 152, the front wheel frame 158, the rear wheel frame 160 and the external keel 186 are made of ultra-high molecular weight (UHMW) polyethylene. The front and rear wheels 110, 112 are made of rubber that is connected to a rim 113 (FIG. 8) made of ultra-high molecular weight (UHMW) polyethylene. It is contemplated that the ski body 150, the central keel 152, the front wheel frame 158, the rear wheel frame 160, the front wheel 110, the rear wheel 112 and the external keel 186 could be made of other suitable materials. It is also contemplated that the ski body could differ from the one shown in the present implementation. For instance, the ski body could be free of an external keel 186 and/or the central keel 152 could be laterally offset from the longitudinal centerline of the ski body. As mentioned above, the front portion of the ski body 150 curves upwards. The middle and rear portions of the ski body 150, as seen in FIGS. 2 and 9, are generally flat except for a portion adjacent to the rear end that is angled upwards.

Referring to FIGS. 4, 5, 11 and 12, the front and rear of the ski body 150 are tapered and the sides of the middle portion are parallel. It is contemplated that the ski body 150 could have a general shape other than as shown in the illustrated implementation. For example, the ski body 150 could have a sidecut or a flat rear end. The ski body 150 has left and right longitudinally extending walls 188 extending upwards from an upper surface of the ski body 150. The walls 188 are disposed laterally inwards of the lateral sides of the ski body 150. It is contemplated that the walls 188 could be disposed along the lateral sides of the ski body 150, and that they could extend more or less in the longitudinal direction of the ski body 150 than as shown in the illustrated implementation. The handle 154 is connected to the ski body 150 between the walls 188. Apertures 190 are defined in the walls 188 to receive the bolt 126 used to fasten the ski 102 to the ski leg 104. The portions of the walls 188 surrounding the apertures 190 are thicker than other portions of the walls 188 in order to reinforce these portions of the walls 188. Ribs 192, extending laterally outwards from the walls 188, provide structural reinforcement to the walls 188. It is contemplated that ribs extending laterally inwards from the walls 188 could be provided. It is also contemplated that the ribs 192 could be omitted.

Referring to FIGS. 5 and 12, the slot 122 is defined by and extends through the ski body 150 and the central keel 152. The slot 122 extends longitudinally between the walls 188 and is disposed along the longitudinal centerline 156 of the ski 102. It is contemplated that the slot 122 could be laterally offset from the longitudinal centerline 156 of the ski 102. It is also contemplated that the slot 122 could be defined in the central keel 152 and the ski body 150 but only open at a bottom of the central keel 152 and not extend through the central keel 152 and the ski body 150. The longitudinal central portion 194 of the slot 122 is wider than the portions of the slot 122 adjacent to it in order to accommodate a connection between the ski runner 106 and the ski runner adjustment assembly 108.

Referring to FIG. 12, a rear end 196 of the slot 122 is defined by the walls 198 of the rear ski adapter 182. The rear ski adapter 182 includes a slot 200. The slot 200 defines a rear wall 202 of the slot 122. The slot 200 of the rear ski adapter 182 is adapted for receiving a rear portion 204 (FIG. 6) of the ski runner 106. A front end 206 of the slot 122 is defined by the walls 208 of the front ski adapter 166. The front ski adapter 166 has the slot 210 (FIG. 8). The slot 210 defines a front wall 212 of the slot 122. The slot 210 is adapted for receiving a front portion 214 (FIG. 6) of the ski runner 106.

In addition, the slots 200, 210 include widened portions 216, 218 respectively. The widened portions 216, 218 may improve the liberty of movement of the ski runner 106 in the slots 200, 210. As can be seen in FIGS. 6, 11 and 12, the rear and front walls 202, 212 of the slot 122 are parallel to each other. In the present implementation, the walls 202, 212 are flat. It is contemplated that the walls 202, 212 could not be flat, but still could provide parallel surfaces along which the ski runner 106 can move.

Referring to FIGS. 6 and 11, the ski runner 106 has a ski runner body 220. The ski runner body 220 has a rear flat wall 222 and a front flat wall 224. The walls 222, 224 are parallel to each other. When the ski runner 106 is inserted in the slot 122, the walls 220, 224 are parallel to the walls 198, 208 of the rear and front ski adapters 182, 164 respectively. When the ski runner 106 is moved in the slot 122, the wall 222 of the ski runner body 220 translates along the walls 198 and the wall 224 of the ski runner body 220 translates along the walls 208. The ski runner body 220 has a lower edge referred to herein as the ground engaging edge 226. The ground engaging edge 226 is straight and perpendicular to the walls 222, 224. It is contemplated that the ground engaging edge could not be straight. For example, the ground engaging edge 226 could be convex. It is also contemplated that the ground engaging edge 226 could not be perpendicular to the walls 222, 224. The ground engaging edge 226 forms a channel inside which are received wearbars 228. The wearbars 228 are brazed to the ski runner body 220. The wearbars 228, as their name suggest, are intended to make contact with the ground G and wear instead of the ski runner body 220. The wearbars 228 are sometimes referred to as carbides in reference to the material from which they are usually made. It is contemplated that the wearbars 228 could be connected to the ski runner body 220 by other means. It is also contemplated that the wearbars 228 could be omitted. In addition, the ski runner body 220 defines an arcuate slot 230 in a central portion thereof. The arcuate slot 230 is closer to the rear wall 222 than to the front wall 224.

Turning now to FIGS. 2, 6, 9, 11, 14 and 15, the ski runner adjustment assembly 108 will be described in more detail. The ski runner adjustment assembly 108 includes a housing 300 inside which an adjustment mechanism 302 is housed in part. As will be explained in greater detail below, actuation of the adjustment mechanism 302 causes the ski runner 106 to be moved up or down inside the slot 122.

The housing 300 has a pair of spaced apart tabs 304. The tabs 304 define apertures 306 inside which bushings 308 are inserted. It is contemplated that the bushings 308 could be omitted. The bolt 126 defines an axle about which the ski 102 can pivot, i.e. the ski 102 can pivot relative to the ski pivot axis 128. The bolt 126 is received in the bushings 308 to connect the housing 300 to the ski leg 104. The ski leg 104 is received between the tabs 304. The housing 300 also has a tab 310 defining a frustoconical aperture 312. As can be seen in FIGS. 6 and 11, a rubber grommet 314 is disposed in the aperture 312 of the tab 310. The nut 140 used to connect the ski leg 104 to the ball joint 142 connected to the end of the lower A-arm 64 is received in the grommet 314. As a result, the ski runner adjustment assembly 108 is prevented from pivoting about the pivot axis 148 relative to the ski leg 104. The housing 300 also defines a slot 316 (FIG. 15) in a front thereof, the function of which will be described below.

The adjustment mechanism 302 has two main parts: a shaft 318 having external threads and a shaft 320 having internal threads. The threaded portion of the shaft 318 is received in the threaded portion of the shaft 320. As the shaft 318 rotates, the shaft 320 slides in and out of the housing 300. It is contemplated that the shaft 318 could have the internal thread and that the shaft 320 could have the external thread. Other types of adjustment mechanisms are contemplated. For example, the shafts 318, 320 could be replaced by a rack and pinion assembly.

The lower portion of the shaft 318 is received in the housing 300 and the top portion of the shaft 318 protrudes from the top of the housing 300. The shaft 318 is received in a ball bearing 322 that is press-fit in a top of the housing 300. As such, the shaft 318 can rotate about a rotation axis 324. However, the shaft 318 does not slide along the rotation axis 324. The top of the ball bearing 322 abuts an inner flange 326 defined by the housing 300. The bottom of the ball bearing 322 abuts the top of a sleeve 328 inserted in the housing 300. The bottom of the sleeve 328 abuts a C-clip 330 clipped in the housing 300. As such, the C-clip 330 and the flange 326 prevent the ball bearing 322 and the sleeve 328 from sliding along the rotation axis 324. The sleeve 328 also defines a slot 332 in alignment with the slot 316 of the housing 300. The shaft 318 has a shoulder 334 that abuts the bottom of the ball bearing 322. The portion of the shaft 318 below the shoulder 334 has an external thread thereon.

The shaft 320 is received in the sleeve 328 inside the housing 300 and protrudes from a bottom of the housing 300. The shaft 320 has a bore 336 defined in a top thereof. The bore 336 has an internal thread. The lower threaded portion of the shaft 318 is received in and engages the thread in the bore 336. Grease could be provided in the interface 338 between the shafts 318, 320. An aperture 340 extends from an outer surface of the shaft 320 in order to permit water entering the bore 336 to be drained therefrom. The aperture 340 opens in a front of the shaft 320 such that water draining from the bore 336 then drains out of the sleeve 328 and the housing 300 via the slot 332.

Figure 15:
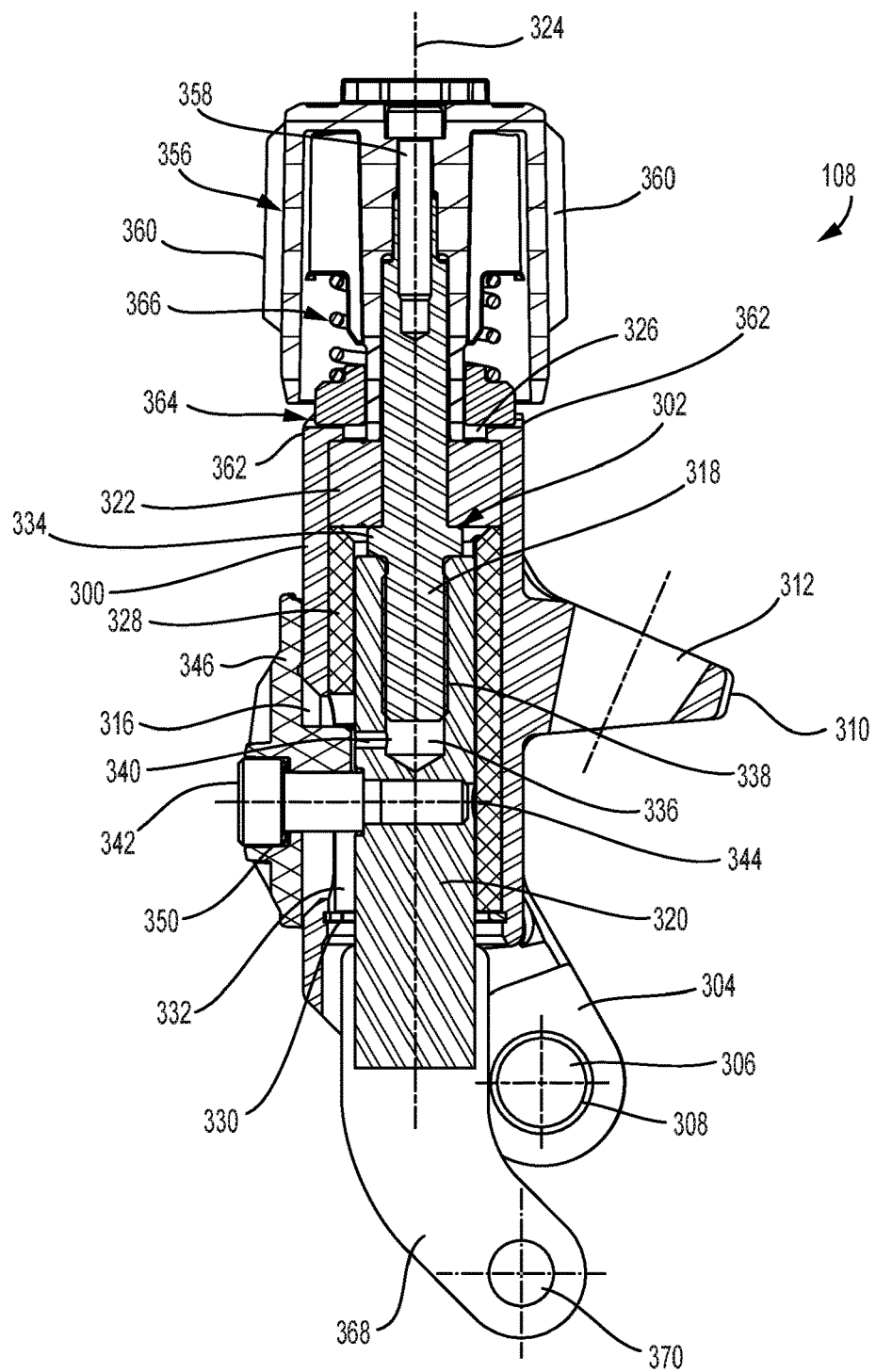
FIG. 15 is a cross-sectional view of the ski runner adjustment assembly of FIG. 14 taken along cross-section line 15-15 of FIG. 14.

A screw 342 is inserted through the slots 316, 332 and into a counterbored aperture 344 in the shaft 320. As can be seen in FIG. 15, the aperture 344 is perpendicular to the rotation axis 324 and is disposed below the aperture 336. As explained above, turning the shaft 318 causes the shaft 320 to move along the rotation axis 324. The screw 342 abuts the sides of the slots 316, 332 thereby preventing the shaft 320 to rotate about the axis rotation with the shaft 318. The screw 342 also prevents the shaft 320 from moving too far down along the rotation axis 324 by coming into contact with the bottom portion of the slots 316, 332, thereby stopping the shaft 320 before the threads of the shafts 318, 320 disengage from each other. The upward movement of the shaft 320 is stopped when the top end of the shaft 320 comes into contact with the shoulder 334 of the shaft 318 as shown in FIG. 15.

The screw 342 is also inserted through a cover 346 disposed outside the housing 300 so as to cover the slot 316 in the housing to reduce the entry of snow and water into the housing 300 via the slot 316. A clearance 348 (FIG. 14) is provided in the bottom center of the cover 346 to permit water drainage from the interior of the housing 300 through the slots 316, 332. An O-ring 350 is disposed between the head of the screw 342 and the cover 346 to prevent the entry of snow and water. The cover 346 moves along the outer surface of the housing 300 with the shaft 320 as the shaft 320 is moved along the rotation axis 324. For this reason, the cover 346 is also used as a position indicator. The cover 346 is provided with triangular projections 352 that provide an indication of the position of the shaft 320, and therefore of the ski runner 106, along markings 354 formed on the outer front surface of the housing 300. To ensure that the screw 342 is not screwed too far into the aperture 344 of the shaft 320, which would squeeze the cover 346 between the screw head of the screw 342 and the outer surface of the housing 300, thereby hindering movement of the shaft 320, the screw 320 has a shoulder that abuts the bottom of the counterbore of the aperture 344 once it has been sufficiently screwed in the aperture 344.

In order to turn the shaft 318, a knob 356 is mounted over the portion of the shaft 318 protruding from the top of the housing 300. The knob 356 is fixed to the shaft 318 by a screw 358. To prevent the knob 356 from turning relative to the shaft 318, the central portion of the knob 356 disposed over the shaft 318 has a polygonal shape and the top portion of the shaft 318 has a corresponding polygonal shape. Alternatively, the central portion of the knob 356 and the top portion of the shaft 318 could be splined, keyed, or circular but for corresponding flat surface for example. The knob 356 has a generally oval cross-section (as viewed from above in FIG. 4), with a number of teeth 360 protruding from its sides to facilitate gripping of the knob 356 by the user.

Although the shaft 320 can have an infinite number of positions within its range of positions, in order to make it easier for the user to set the same position on both the left and right ski assemblies 100, the ski runner adjustment assembly 108 provides auditory and haptic feedbacks to the user at a number of pre-set positions. To provide the auditory and haptic feedbacks, the housing 300 has a pair of notches 362 along the top edge thereof which are selectively engaged by a clicker 364. The clicker 364 is an annulus disposed in the knob 356 that is biased against the top edge of the housing 300 by a spring 366. The clicker 364 has a pair of protrusions on the bottom thereof. When the knob 356 is turned, the protrusions on the bottom of the clicker 364 eventually fall into the notches 362 thereby producing a clicking sound. The spring 366 provides some resistance to turning the knob 356 to make the protrusions on the bottom of the clicker 364 come out of the notches 362 thereby provide a haptic feedback that a pre-set position has been reached. As the notches 362 are provided on opposite sides of the housing 300, the pre-set positions correspond to every half turn of the knob 356. It is contemplated that only one or more than two notches 362 could be provided. It is also contemplated that only one or more than two protrusions could be provided on the bottom of the clicker 364. It is also contemplated that the number of notches 362 and the number of protrusions provided on the bottom of the clicker 364 could differ. It is contemplated that the clicker 364 and its associated component could be omitted and that the user could rely only on the position indicator (i.e. cover 346) and markings 354 to determine the position of the shaft 320, and therefor the ski runner 106. It is contemplated that the position indicator (i.e. cover 346) and markings 354 could also be omitted. It is contemplated that other means could be provided to determine the position of the ski runner 106 relative to the ski 102, such as, for example, level markings on the side of the ski runner 106.

To connect the shaft 320 to the ski runner 106, a pair of bent arms 368 is connected to lower portion of the shaft 320. It is contemplated that the arms 368 and the shaft 320 could be integrally formed. Each arm has an aperture 370. The ski runner 106 is inserted between the arms 368 with the arcuate slot 230 (FIGS. 6 and 11) aligned with the apertures 370. A connector in the form of a pin 372 (FIGS. 6 and 11) is inserted into the apertures 370 of the arms 370 and the arcuate slot 230, thereby connecting the ski runner 106 to the ski runner adjustment assembly 108.

The pin 372 is the only connection between the ski runner 106 and any other part of the ski assembly 100 such that the ski runner 106 is held in place with respect to ski 102 by the adjustment mechanism 302 and ski leg 104. As such, forces applied to the ski runner 106 are transferred to the adjustment mechanism 302 by the connection provided therebetween by the pin 372, then from the adjustment mechanism 302 to the housing 300 by the connection provided therebetween by the bearing 322, and the from the housing 300 to the ski leg 104 by the connection provided therebetween by the bolt 126.

To adjust the position of the ski runner 106 relative to the ski 102 to change the amount by which the ski runner 106 protrudes from the central keel 152, a user only needs to turn the knob 356. When the knob 356 is turned, the shaft 320 moves along the rotation axis 324, which in turn causes the pin 372 to move in the same direction along an adjustment axis (not shown) parallel to the rotation axis 324.

Starting from the position of the ski runner 106 shown in FIGS. 2 to 6, by turning the knob 356 in one direction (i.e. clockwise), the ski runner adjustment assembly 108 moves the pin 372 down along the adjustment axis (not shown) which causes the ski runner 106 to move down along a translation axis (not shown) to a lowered position, such as the one shown in FIGS. 9 to 11, where the distance between the bottom 124 of the ski runner 106 and the bottom 120 of the ski 102 is greater than in the raised position shown in FIGS. 2 to 6. Moreover, it can be seen in FIGS. 2 to 6 that the bottom 124 of the ski runner 106 extends above the lower portions 116, 118 of the front and rear wheels 110, 112 respectively. In FIGS. 9 to 11, the bottom 124 of the ski runner 106 extends below the lower portions 116, 118 of the front and rear wheels 110, 112 respectively. It should also be understood that the ski runner 106 could be positioned at positions intermediate the raised position and the lowered position shown respectively in FIGS. 2 to 6 and FIGS. 9 to 11.

Figure 16:
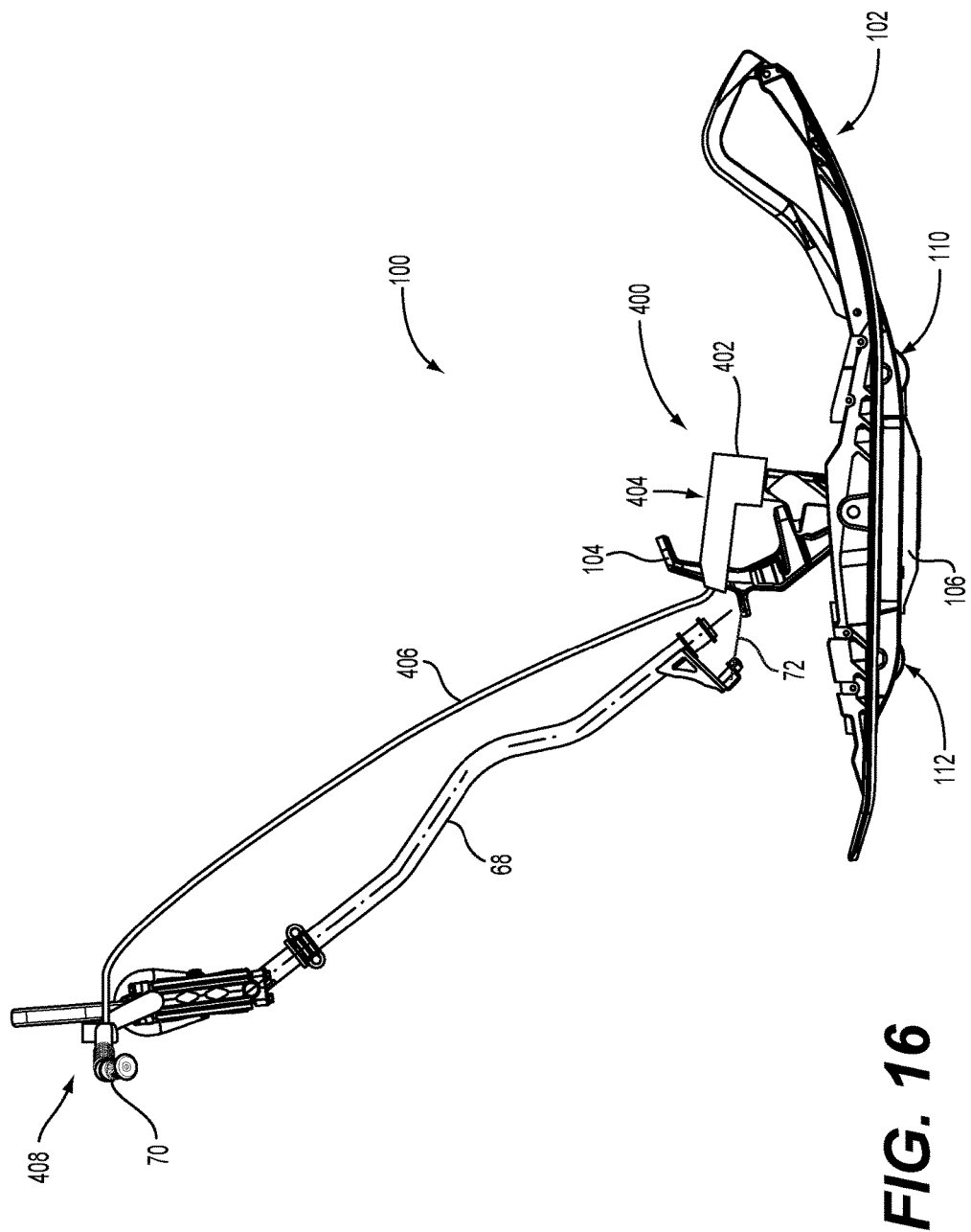
FIG. 16 is a right side elevation view of the portion of the steering assembly and the ski assembly of FIG. 13, with an alternative implementation of the ski runner adjustment assembly.

Turning now to FIG. 16, an alternative implementation of the ski runner adjustment assembly 108 will be described. FIG. 16 illustrates a portion of a steering assembly and a ski assembly 100 as described above, but having a ski runner adjustment assembly 400. For simplicity, elements of the ski runner adjustment assembly 400 that are similar to those of the ski runner adjustment assembly 108 described above have been numbered with the same reference numerals and will not be described again. In this implementation, the knob 356 of the ski runner adjustment assembly 108 and its related components, such as the clicker 364 and the spring 366, are omitted.

An electric motor 402 is received in a housing 404. The housing 404 is connected to the ski leg 104 and to a top portion of the ski runner adjustment assembly 400. The electric motor 402 has an output shaft (not shown) and the output shaft includes a socket (not shown). The socket has a polygonal shape and the top portion of the shaft 318 has a corresponding polygonal shape. Alternatively, the socket and the top portion of the shaft 318 could be splined, keyed, or circular but for corresponding flat surface for example. When the top portion of the shaft 318 is connected to the socket of the output shaft of the electric motor 402, the electric motor 402 is operatively connected to the shaft 318. The electric motor 402 can be activated so that the output shaft is rotated clockwise or counter clockwise. A wire 406 is connected to the electric motor 402. The wire 406 extends along the steering column 68 and connects to a switch 408 that is connected to the handlebar 70 or elsewhere on the snowmobile 20 such that the rider may operate the switch 408 while riding. The switch 408 is understood to be connected to the electrical system 36 of the snowmobile 20. The switch 408 is a three-position switch having the following positions: an "off" position, turning off the electric motor 402; a "ski runner up" position activating the electric motor 402 such that the ski runner 106 moves upwardly in the slot 122; and a "ski runner down" position activating the electric motor 402 such that the ski runner 106 moves downwardly in the slot 122. When released from the "ski runner up" position, the switch 408 returns to the "off" position. When released from the "ski runner down" position, the switch 408 also returns to the "off" position. It is contemplated that the switch 408 could differ from the one described herein. It is to be understood that, in one implementation, the position of the ski runners 106 can be fully controlled by the rider. In some implementations, it is contemplated that each discrete actuation (i.e. click) of the switch 408 could move the ski runners 106 up or down from a predetermined amount.

It is also to be understood that both left and right ski runner adjustment assemblies 400 include an electric motor 402, a housing 404 and a wire 406. Both left and right electric motors 402 are activated using a single switch 408 so that both ski runners 106 are simultaneously moved up or down by the same amount. The snowmobile 20 includes an electronic control module connected to the switch 408 and connected to the electric motor 402 for each of the left and right ski runner adjustment assemblies 400 for controlling the ski runners 106 of both ski assemblies 100.

An illustrative scenario of the operation of the ski runner adjustment assembly 400 will now be described. The illustrative scenario is based on the hypothesis that both the left and right ski runners 106 extend initially below the lower portions 116, 118 of the front and rear wheels 110, 112 respectively (i.e. the ski runners 106 are in the lowered position shown in FIGS. 9 to 11) and that the snowmobile 20 is ridden on a trail covered with soft snow. As the snowmobile 20 arrives at a paved road that the trail crosses, the rider stops the snowmobile 20 and the switch 408 is moved by the rider from the "off" position to the "ski runner up" position. The electric motors 402 of the left and right ski runner adjustment assemblies 400 are activated and rotate the respective shaft 318 so that the left and right ski runners 106 are moved upwardly simultaneously. When the front and rear wheels 110, 112 make contact with the ground surface G and when the ski runners 106 have been moved upwardly such that the bottom 124 of the ski runners 106 are above the lower portions 116, 118 of the wheels 110, 112 respectively, the rider releases the switch 408 which returns to the "off" position. The rider then drives the snowmobile 20 across the paved road. When the snowmobile 20 is ridden on the paved road, the front and rear wheels 110, 112 provided on the left and right skis 102 reduce wear of at least one of the central keel 152, the external keel 186 and the wearbars 228 of each ski assembly 100. Once the paved road is crossed, the rider stops the snowmobile 20 where the trail covered with soft snow continues. The switch 408 is moved by the rider from the "off" position to the "ski runner down" position. The electric motors 402 of the left and right ski runner adjustment assemblies 400 are activated and rotate the respective shaft 318 such that the left and right ski runners 106 are moved downwardly simultaneously. When the bottom 124 of the ski runners 106 extend below the lower portions 116, 118 of the front and rear wheels 110, 112 respectively and when the ski runners 106 have been moved downwardly by a sufficient amount, the rider releases the switch 408 which returns to the "off" position. The rider then drives the snowmobile 20 on the trail.

It is contemplated that the ski runner adjustment assembly 400 could further include some kind of auditory and/or visual feedback apparatus for indicating to the rider the position of the ski runners 106 with respect to the front and rear wheels 110, 112 of each ski assembly 100. For instance, a visual indication could appear on a display cluster of the snowmobile 20 indicating the position of the ski runners 106, and/or a sound could be emitted when the ski runners 106 are moved such that the bottom 124 of the ski runners 106 extend below the lower portions 116, 118 of the front and rear wheels 110, 112 respectively. It is contemplated that the indicator could be provided in the display cluster 80 (FIG. 28) or a separate indicator located on the handlebar 70.

Figure 17:
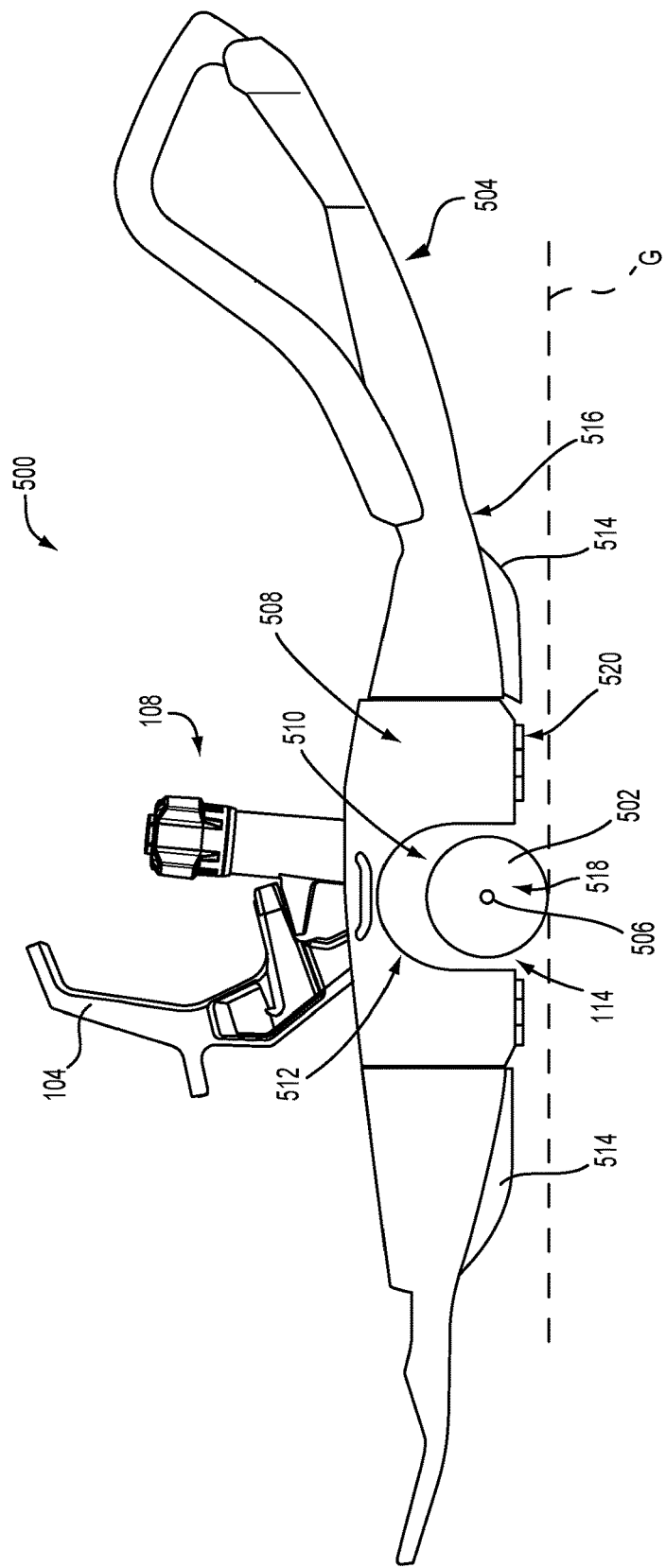
FIG. 17 is a longitudinal cross-sectional view of an alternative implementation of a left ski assembly of the snowmobile of FIG. 1 illustrated schematically, with a ski runner in a raised position.
Figure 18:
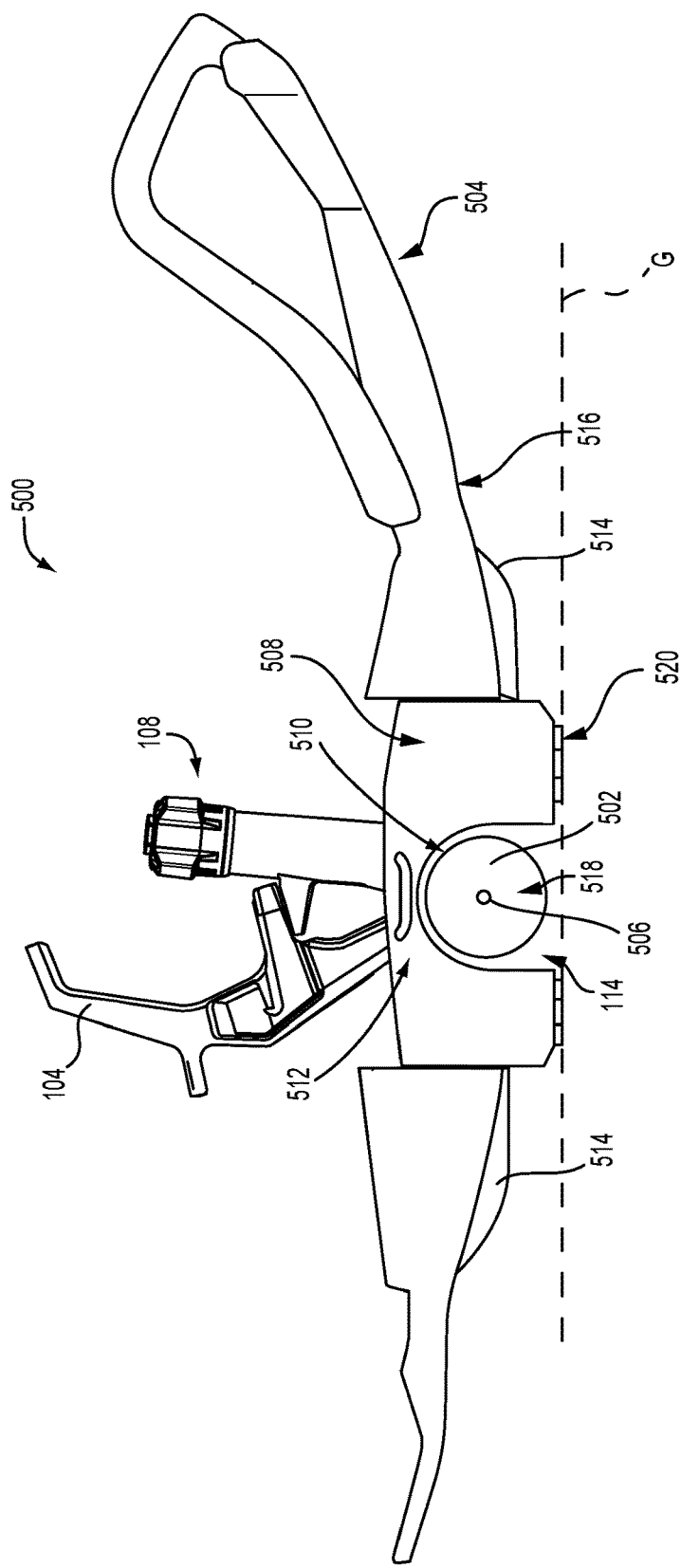
FIG. 18 is a longitudinal cross-sectional view of the ski assembly of FIG. 17, with the ski runner in a lowered position.

Turning now to FIGS. 17 and 18, an alternative implementation of the ski assembly 100 will be described. FIGS. 17 and 18 illustrate a ski assembly 500. For simplicity, elements of the ski assembly 500 that are similar to those of the ski assembly 100 described above have been numbered with the same reference numerals and will not be described again.

The ski assembly 500 shown in FIGS. 17 and 18 is a left ski assembly 500. The ski assembly 500 has a single wheel 502 positioned in a middle portion of the ski 504. The wheel 502 is rotatably connected to the ski 504 through an axle 506. The ends of the axle 506 are connected to the longitudinally extending walls 188 of the ski 504. The axle 506 is positioned below the ski pivot axis 128 (shown in FIGS. 2, 4 and 6). The ski assembly 500 further includes a ski runner 508. The ski runner 508 has a slot 510. The slot 510 is shaped so as to provide clearance to the wheel 502 while allowing for vertical movement of the ski runner 508. The ski runner 508 is movable upwardly and downwardly using the ski runner adjustment assembly 108, as described above. It is contemplated that the lowest position into which the ski runner 508 can be configured corresponds to the wheel 502 contacting the upper portion 512 of the slot 510 of the ski runner 508. The ski 504 has a central keel 514 provided on a bottom 516 of the ski 504. As can be seen on FIG. 17, a lower portion 518 of the wheel 502 extends below the central keel 514, the bottom 516 of the ski 504 and a bottom 520 of the ski runner 508. Still referring to FIG. 17 where the ski runner 508 is in the raised position, when the snowmobile 20 is disposed on flat, level ground G, such as when riding on asphalt, concrete or wood, the ski assembly 500 is supported on the ground G by the wheel 502. As can be seen in FIG. 18 where the ski runner 508 is in the lowered position, when the snowmobile 20 is disposed on flat, level ground G, such as when riding on an icy level surface, the ski assembly 500 is supported on the ground G by the ski runner 508 as the central keel 514, the bottom 516 of the ski 504 and the wheel 502 are spaced from the ground G.

Figure 19:
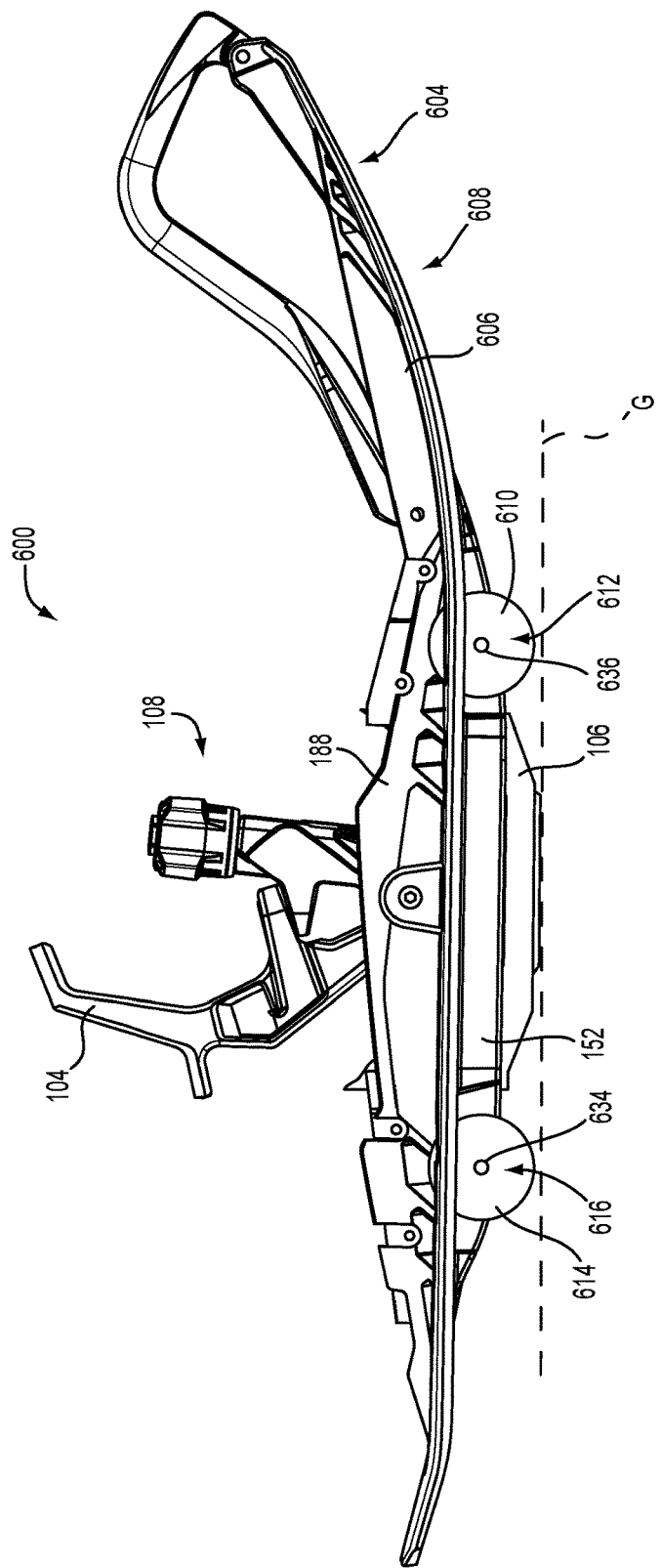
FIG. 19 is a right side elevation view of an alternative implementation of a left ski assembly of the snowmobile of FIG. 1, with a ski runner in a lowered position.
Figure 20:
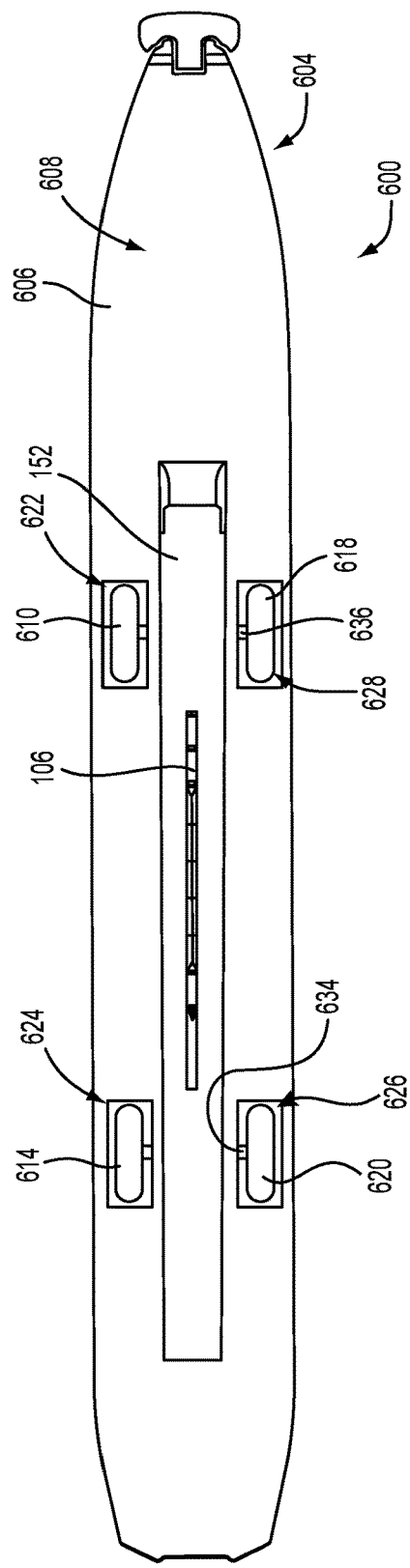
FIG. 20 is a bottom plan view of the ski assembly of FIG. 19.

Turning now to FIGS. 19 and 20, an alternative implementation of the ski assembly 100 will be described. FIGS. 19 and 20 illustrate a ski assembly 600. For simplicity, elements of the ski assembly 600 that are similar to those of the ski assembly 100 described above have been numbered with the same reference numerals and will not be described again.

The ski assembly 600 shown in FIGS. 19 and 20 is a left ski assembly 600. The ski assembly 600 includes a ski 604 having a ski body 606. The ski body 606 has a bottom 608 and a central keel 152. The ski assembly 600 includes the ski leg 104 and the ski runner 106 is connected to the ski runner adjustment assembly 108, as described above. The ski assembly 600 has four wheels: a front right wheel 610, a rear right wheel 614, a front left wheel 618 and a rear left wheel 620. Each one of the wheels 610, 614, 618, 620 extends through a corresponding aperture defined in the ski body 604: a front right aperture 622, a rear right aperture 624, a front left aperture 628 and a rear left aperture 626. The left and right front wheels 618, 610 are rotatably connected to the ski body 604 via a front axle 636 extending through the ski body 606 forward of the ski runner 106. The left and right rear wheels 618, 614 are rotatably connected to the ski body 606 via a rear axle 634 extending through the ski body 606 rearward of the ski runner 106. Each one of the wheels 610, 614, 618, 620 has a bottom portion. In FIG. 19, only bottom portions 612, 616 of the right front wheel 610 and the right rear wheel 614, respectively, are shown. The wheels 610, 614, 618, 620 are disposed on the outer sides of the longitudinally extending walls 188 of the ski body 604. The wheels 610, 614, 618, 620 are laterally offset from the ski runner 106. As can be seen in FIG. 19 where the ski runner 106 is in the lowered position, when the snowmobile 20 is disposed on flat, level ground G, such as when riding on an icy level surface, the ski assembly 600 is supported on the ground G by the ski runner 106 and the bottom 608 of the ski 604 and the wheels 610, 614, 618, 620 are spaced from the ground G. In the case where the ski runner 106 is in the raised position when the snowmobile 20 is disposed on flat, level ground G, such as when riding on asphalt, concrete or wood, the ski assembly 600 is supported on the ground G by the wheels 610, 614, 618, 620. In an alternative implementation, the ski assembly 600 only has one of the front wheels 610, 618 and only one of the rear wheels 614, 620. For example, the ski assembly 600 could only have the front right wheel 610 and the rear left wheel 620. In such an implementation, the ski body 606 would only be provided with the apertures 622, 626 corresponding to the wheels 610, 620 respectively.

Turning now to FIGS. 21 to 28, an alternative implementation of the ski assembly 100 and ski runner adjustment assembly 108 will now be described. FIGS. 21 to 26 illustrate a ski assembly 700 having a ski runner adjustment assembly 800. The ski assembly 700 has some elements that are similar to the ski assembly 100 described above and the ski runner adjustment assembly 800 has some elements that are similar to the ski runner adjustment assembly 108 described above. For simplicity, elements of the ski assembly 700 that are similar to those of the ski assembly 100 described above have been numbered with the same reference numerals and will not be described again in detail. Also for simplicity, elements of the ski runner adjustment assembly 800 that are similar to those of the ski runner adjustment assembly 108 described above have been numbered with the same reference numerals and will not be described again in detail.

The ski assembly 700 and ski runner adjustment assembly 800 shown in FIGS. 21 to 26 is a left ski assembly 700 and left ski runner adjustment assembly 800. The snowmobile 20 also includes a right ski assembly 700 and corresponding right ski runner adjustment assembly 800. As the right ski assembly 700 and ski runner adjustment assembly 800 are respectively similar to the left ski assembly 700 and ski runner adjustment assembly 800, only the left one will be described herein.

With reference to FIGS. 21 to 26, the ski assembly 700 includes a ski 102, a ski leg 104 and a ski runner 106. The ski 102 has a ski body 150 having a bottom 120, a central keel 152 and a handle 154. The central keel 152 is positioned inline with a longitudinal centerline 156 of the ski body 150 and entirely formed by the ski body 150. A slot 702 (FIG. 24) is defined by and extends through the central keel 152. The ski runner 106 is disposed in the slot 702 (FIG. 24) defined in the ski body 150. As in the ski assembly 100, the ski runner 106 has a body 220 including a rear wall 222, a front wall 224, a ground engaging bottom edge 226 and wearbars 228. The front and rear walls 224, 222 extend vertically and parallel to one another. The ski runner 106 is operatively connected to the ski 102 via the ski runner adjustment assembly 800 which is used to move the ski runner 106 in the slot 702 to change an amount by which the ski runner 106 extends below the ski 102.

As in the ski assembly 100, the ski assembly 700 has two wheels including: a front wheel 110 and a rear wheel 112. The front and rear wheel frames 158, 160 of the ski assembly 100 are however omitted from the ski assembly 700.

With reference to FIGS. 21, 23, 24 and 26, a flange 740 extends upwards from the upper surface of the ski body 150 around the front end of the slot 702. The flange 740 defines a channel 742 extending vertically and facing rearwardly. The channel 742 is formed continuously with the front end of the slot 702 and extends vertically upwards therefrom. The channel 742 has a C-shaped cross-section when viewed from a top or bottom as in FIGS. 21, 23 and 24. The C-shaped channel 742 has a front wall 744 extending vertically and laterally and a widened portion 746. The front wall 224 of the ski runner 106 is received in the channel 742. Another flange 750 extends upwards from the upper surface of the ski body 150 around the rear end of the slot 702. The flange 750 defines a channel 752 extending vertically and facing forwardly. The channel 752 is formed continuously with the rear end of the slot 702 and extends vertically upwards therefrom. Similar to the channel 742 of the front flange 740, the channel 752 has a C-shaped cross-section as seen best in FIGS. 21 and 24. The C-shaped channel 752 has a rear wall 754 extending vertically and laterally and a widened portion 756. The rear wall 222 of the ski runner 106 is received in the channel 752. The widened portions 746, 756, improve the liberty of movement of the ski runner 106 in the channels 742, 752.

Figure 21:
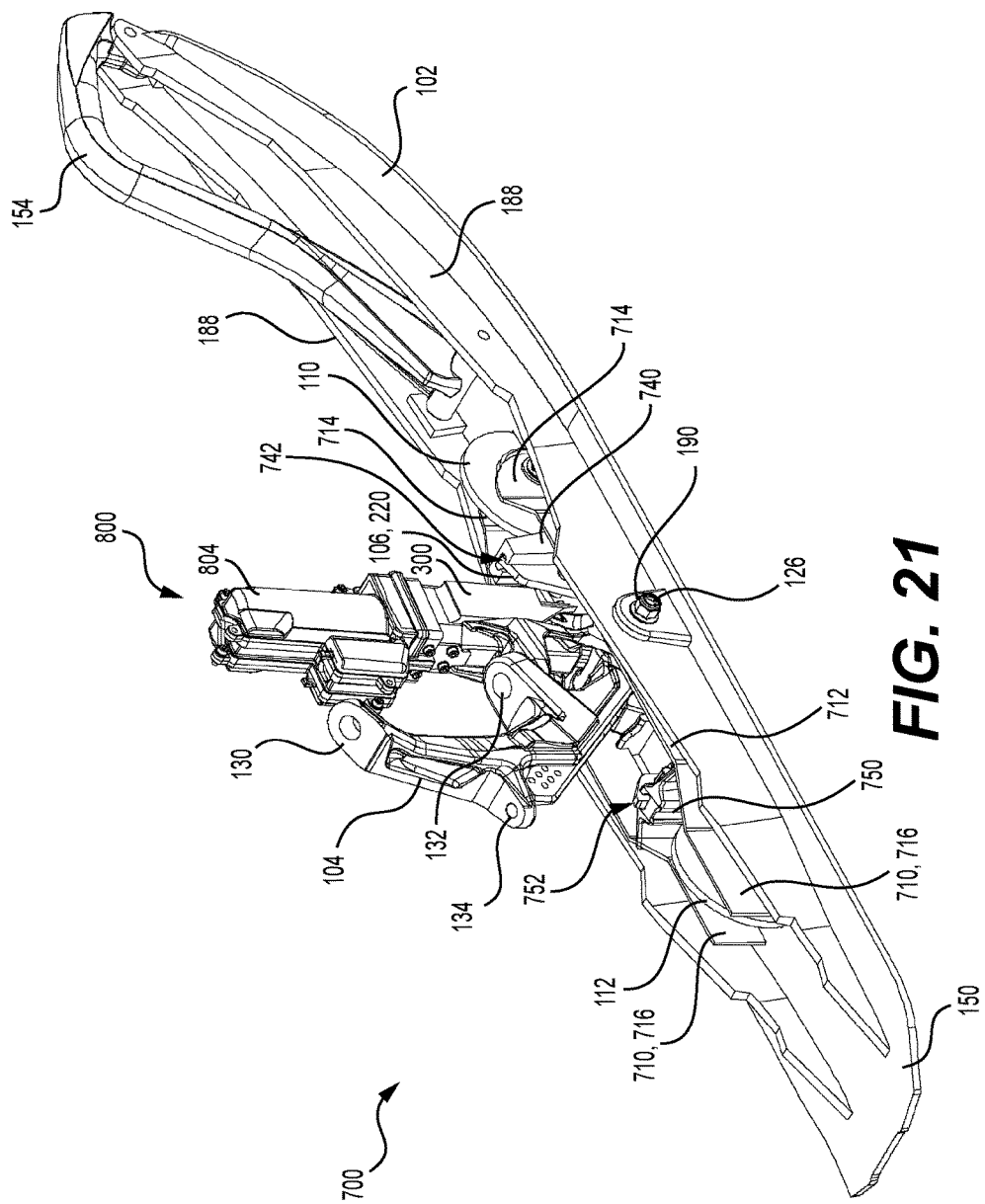
FIG. 21 is perspective view, taken from a top, rear and right side, of another implementation of a left ski assembly with the ski runner in a raised position.
Figure 23:
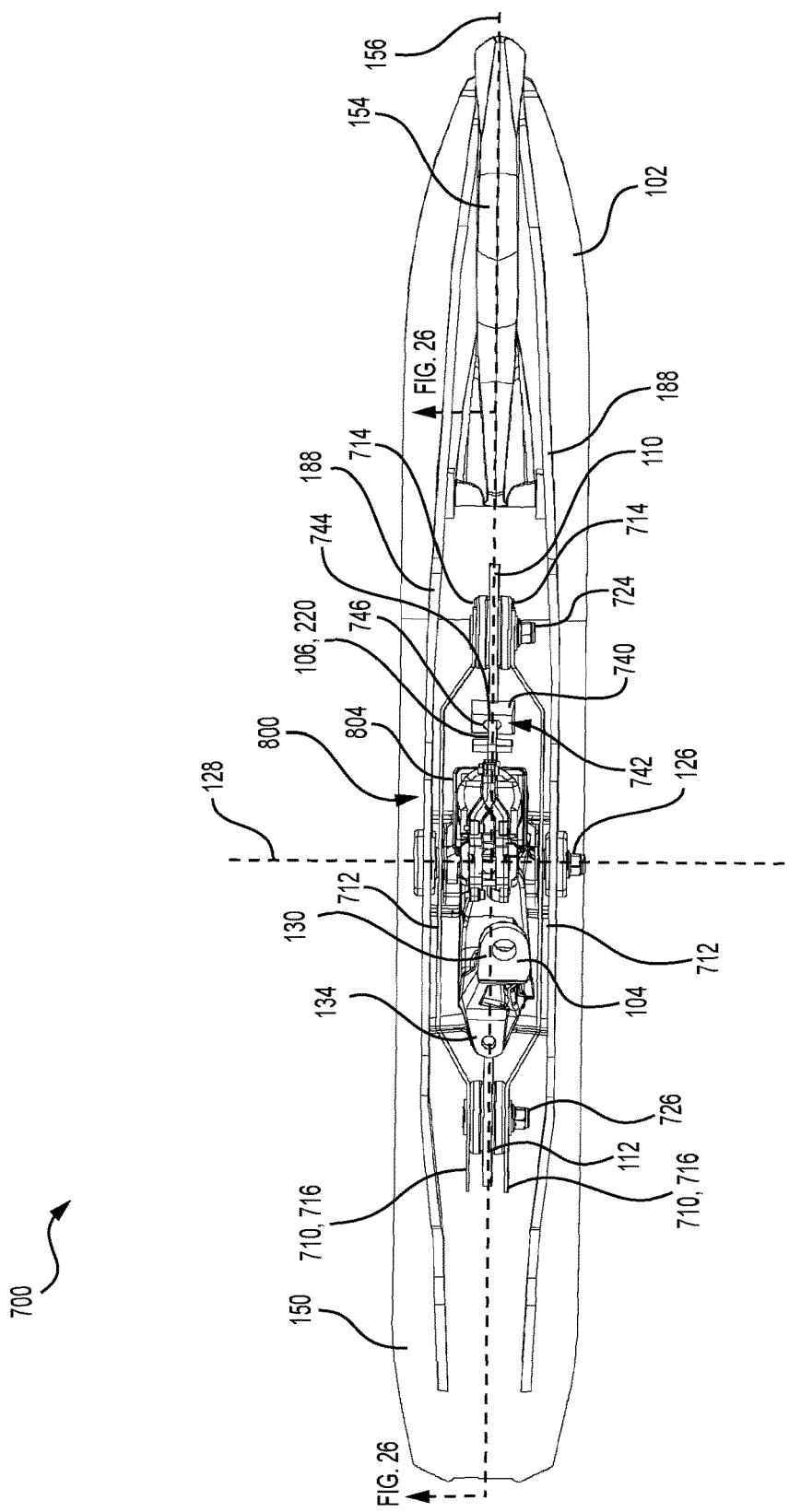
FIG. 23 is a top plan view of the left ski assembly of FIG. 21.
Figure 24:
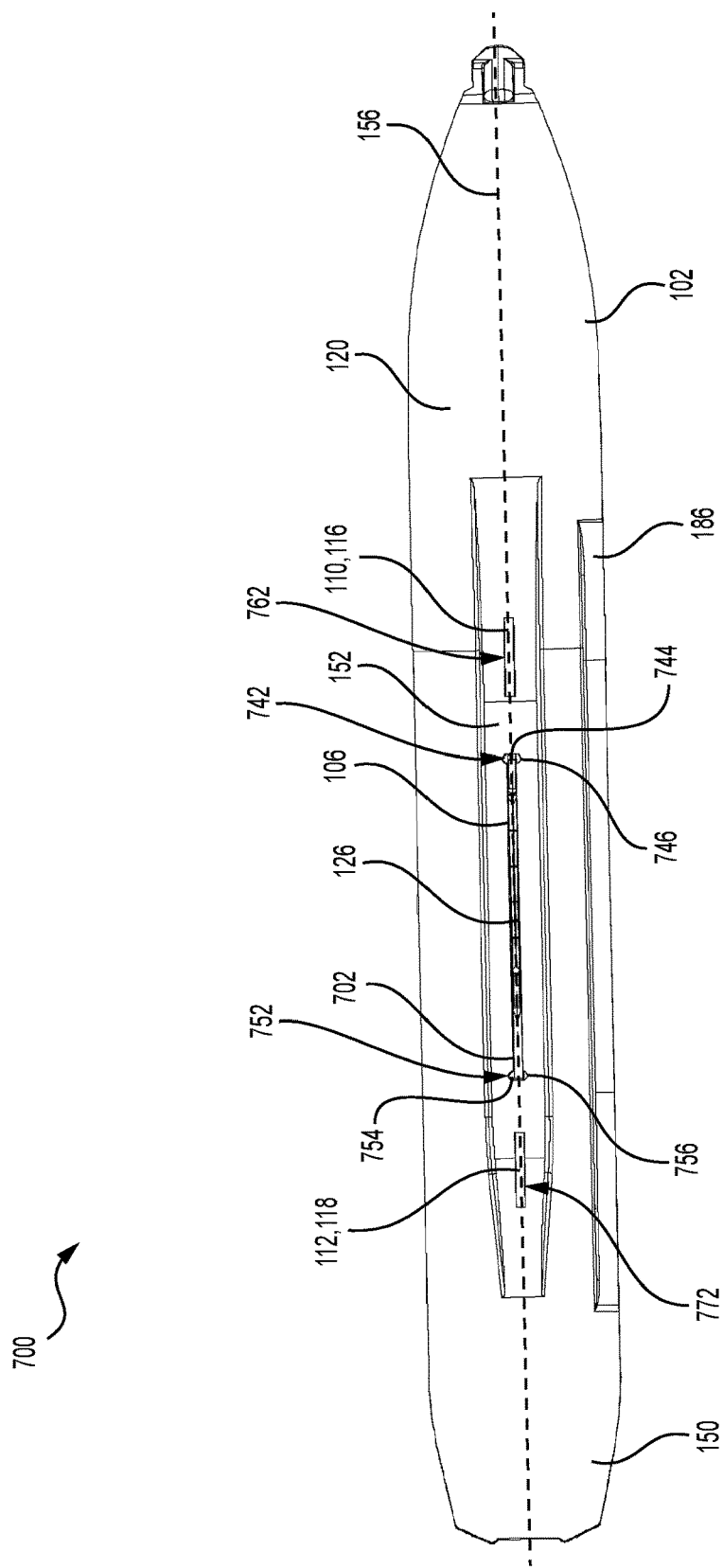
FIG. 24 is a bottom plan view of the left ski assembly of FIG. 21.
Figure 26:
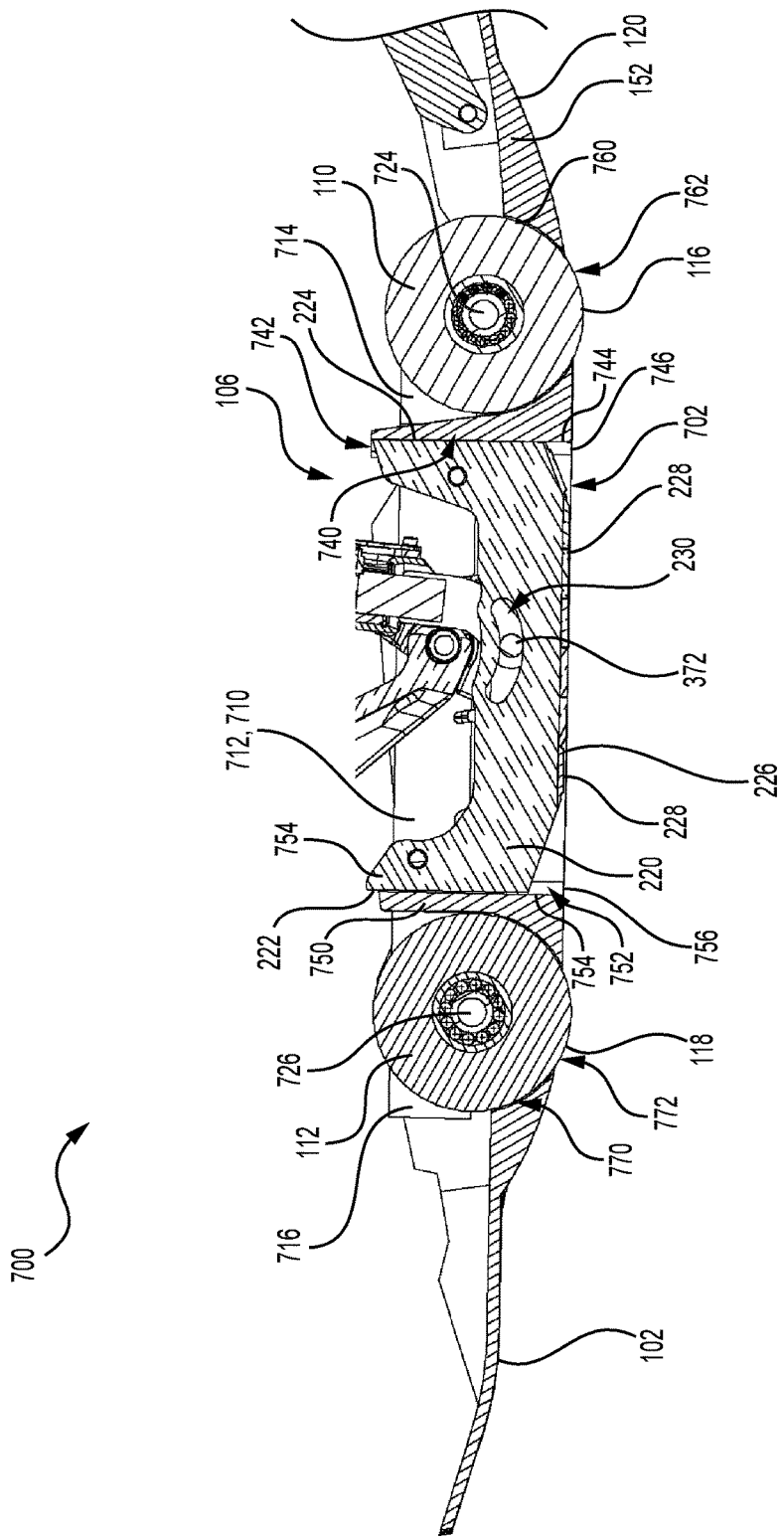
FIG. 26 is a cross-sectional view, taken along the line 26-26 of FIG. 23, showing a portion of the left ski assembly of FIG. 21 including the ski runner and the wheels.

With reference to FIGS. 21, 23 and 26, the ski assembly 700 includes a pair of walls 710 extending vertically upwards from the upper surface of the ski body 150. The walls 710 extend generally longitudinally and are disposed between the walls 188. The left wall 710 has a central portion 712 that extends parallel to the longitudinal centerline 156 on a left side of the ski runner 106 and the ski leg 102. A front portion 714 of the left wall 710 extends parallel to the longitudinal centerline 156 and is disposed longitudinally forward of the front flange 740. A rear portion 716 of the left wall 710 extends parallel to the longitudinal centerline 156 and is disposed longitudinally rearward of the rear flange 750. Each of the front and rear portions 714, 716 of the left wall 710 is disposed laterally inwardly of the central portion 712. The front portion 714 is connected to the central portion 712 by a front connection portion which extends forwardly and laterally inwardly from the central portion 712 and the rear portion 716 is connected to the central portion 712 by a rear connection portion which extends rearwardly and laterally inwardly from the central portion 712. The right wall 710 is similar to a mirror image of the left wall 710 and as such will not be described again herein. As can be seen in FIG. 23, the bolt 126 pivotally connecting the ski 102 to the ski leg 104 extends through the central portions 712 of both walls 710. It is contemplated that the right wall 710 could be different from a mirror image of the left wall 710.

Figure 25:
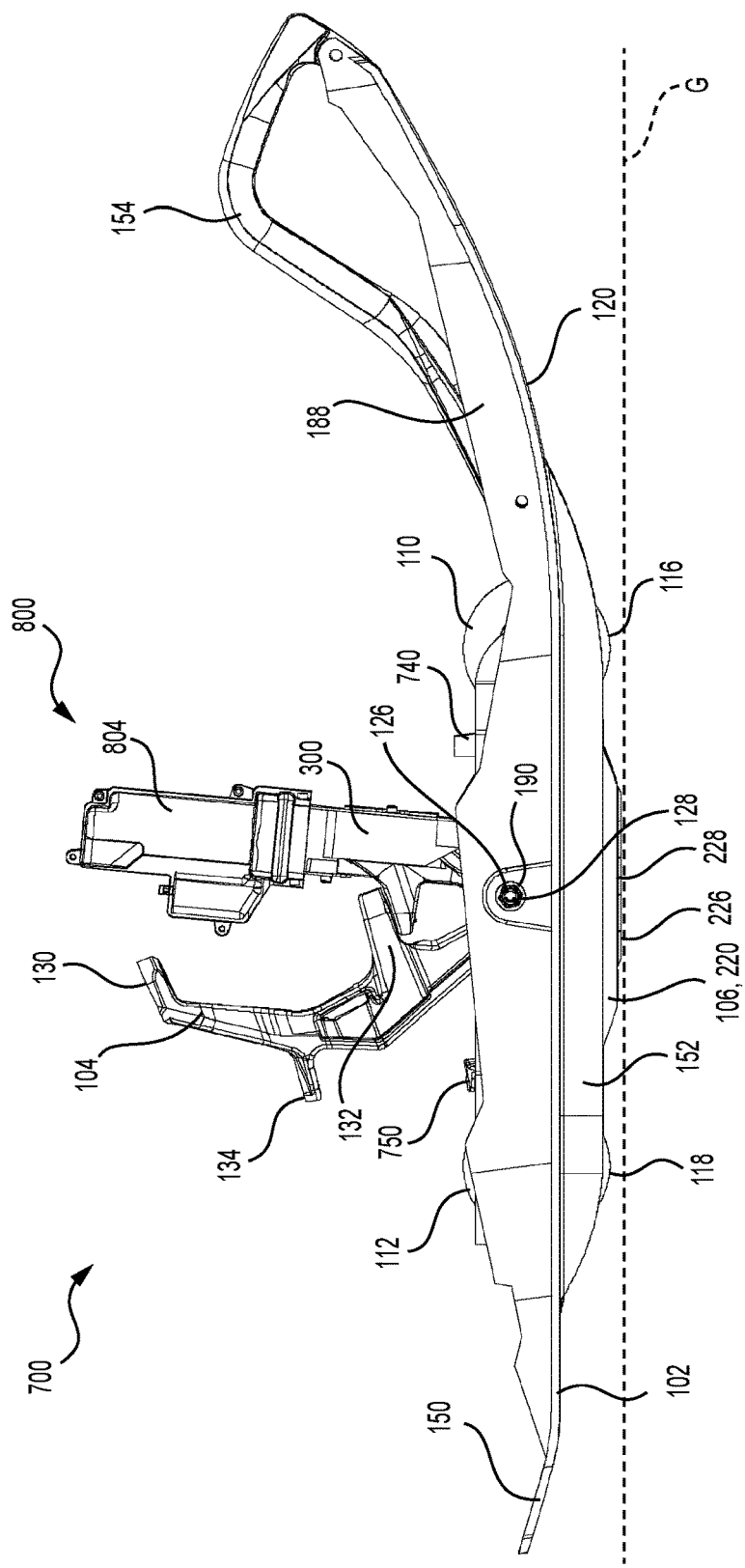
FIG. 25 is a right side elevation view of the left ski assembly of FIG. 21 with the ski runner in a lowered position.

With reference to FIGS. 23 and 26, the front wheel 110 is disposed between the front portions 714 of the left and right walls 710 and rotatably mounted thereto by a front axle 724 extending laterally through the front portions 714. A portion of the front wheel 110 below the front axle 724 is received in a recess 760 formed in the ski body 150. The recess 760 is shaped to be complementary to the front wheel 110. As shown in FIG. 25, the front wheel 110, is mounted to the walls 710 such that the lower portion 116 of the front wheel 110 extends through a front aperture 762 defined in the central keel 152 and is disposed below the bottom 120 of the ski body 150. The rear wheel 112 is similarly disposed between the rear portions 716 of the left and right walls 710 and rotatably mounted thereto by a rear axle 726 extending laterally through the front portions 714. A portion of the rear wheel 112 below the rear axle 726 is received in a recess 770 formed in the ski body 150. The recess 770 is shaped to be complementary to the rear wheel 112. As shown in FIG. 25, the rear wheel 112 is mounted to the wall 710 such that the lower portion 118 of the rear wheel 112 extends through a rear aperture 772 defined in the central keel 152 and is disposed below the bottom 120 of the ski body 150. The walls 710 are removably mounted to the ski body 150 so that the wheels 110, 112 can be installed between the walls 710 before the assembly of wheels 110, 112 and walls 710 is mounted to the ski body 150. In the illustrated implementation, the walls 710 are removably mounted to the ski body 150 by the bolt 126.

The ski runner adjustment assembly 800 will now be described with respect to FIGS. 22, 27 and 28. As mentioned above, the ski runner adjustment assembly 800 has some elements that are similar to the ski runner adjustment assembly 108 described above. The elements of the ski runner adjustment assembly 800 that are similar to those of the ski runner adjustment assembly 108 described above have been numbered with the same reference numerals and will not be described again in detail.

Figure 22:
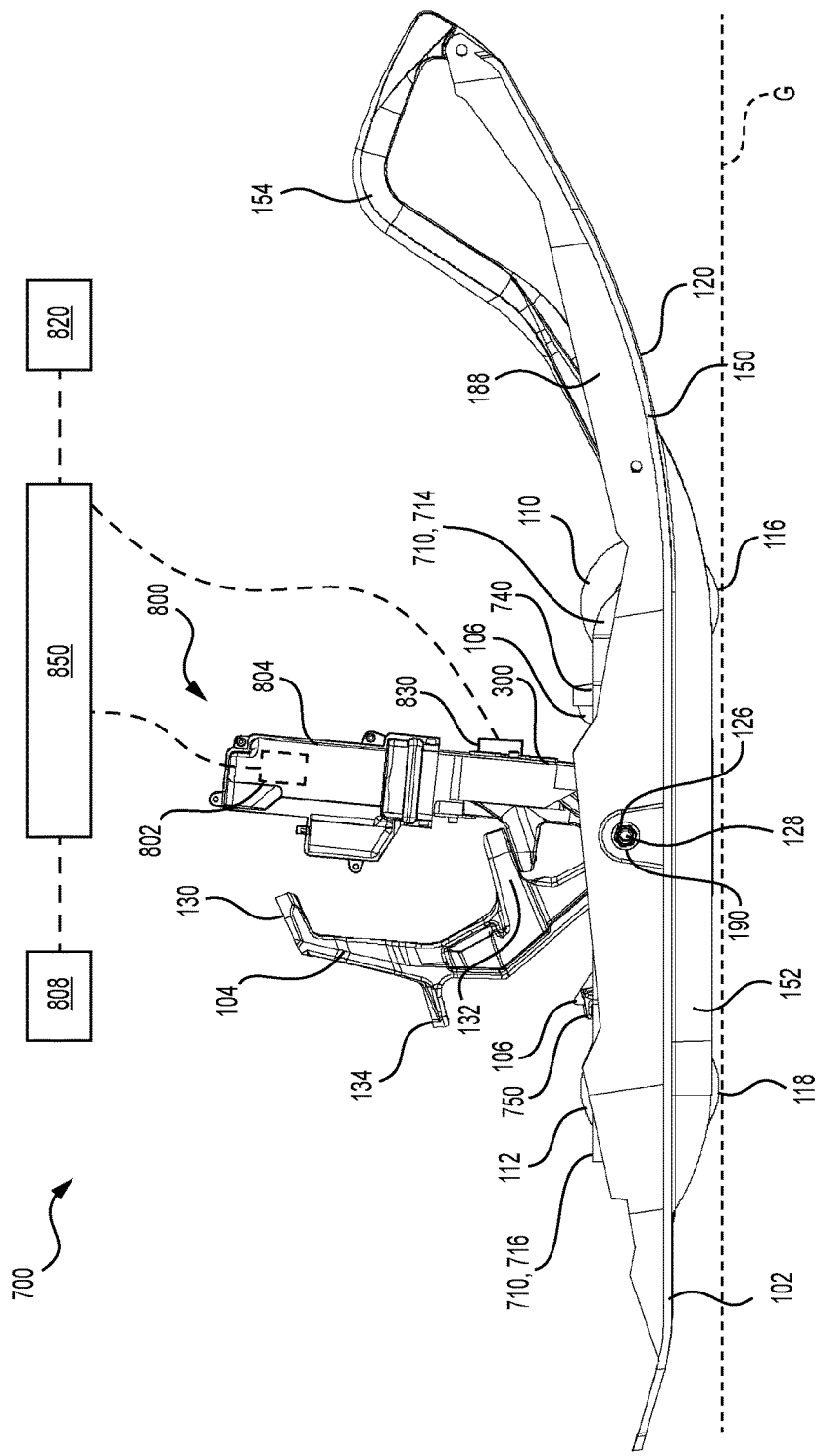
FIG. 22 is a right side elevation view of the left ski assembly of FIG. 21 and including a schematic illustration of a switch, an electronic control module and an indicator connected to the ski runner adjustment assembly.

With reference to FIG. 22, in the ski runner adjustment assembly 800, the knob 356 of the ski runner adjustment assembly 108 and its related components, such as the clicker 364 and the spring 366, have been omitted. The ski runner adjustment assembly 800 instead includes an electric motor 802 for adjusting the position of the shaft 320 and thereby the ski runner 106. The motor 802 is received in a housing 804 which is connected to the top portion of the housing 300 enclosing the shafts 318 and 320. The electric motor 802 has an output shaft (not shown) that is operatively connected to the shaft 318. The electric motor 802 can be activated so that the output shaft, and thereby the shaft 318, is rotated clockwise or counter clockwise for raising or lowering the shaft 320. The electric motor 802 is activated based on the position of a switch 808 (FIG. 27) that is connected to the handlebar 70 such that the rider may operate the switch 808 while riding.

Figure 27:
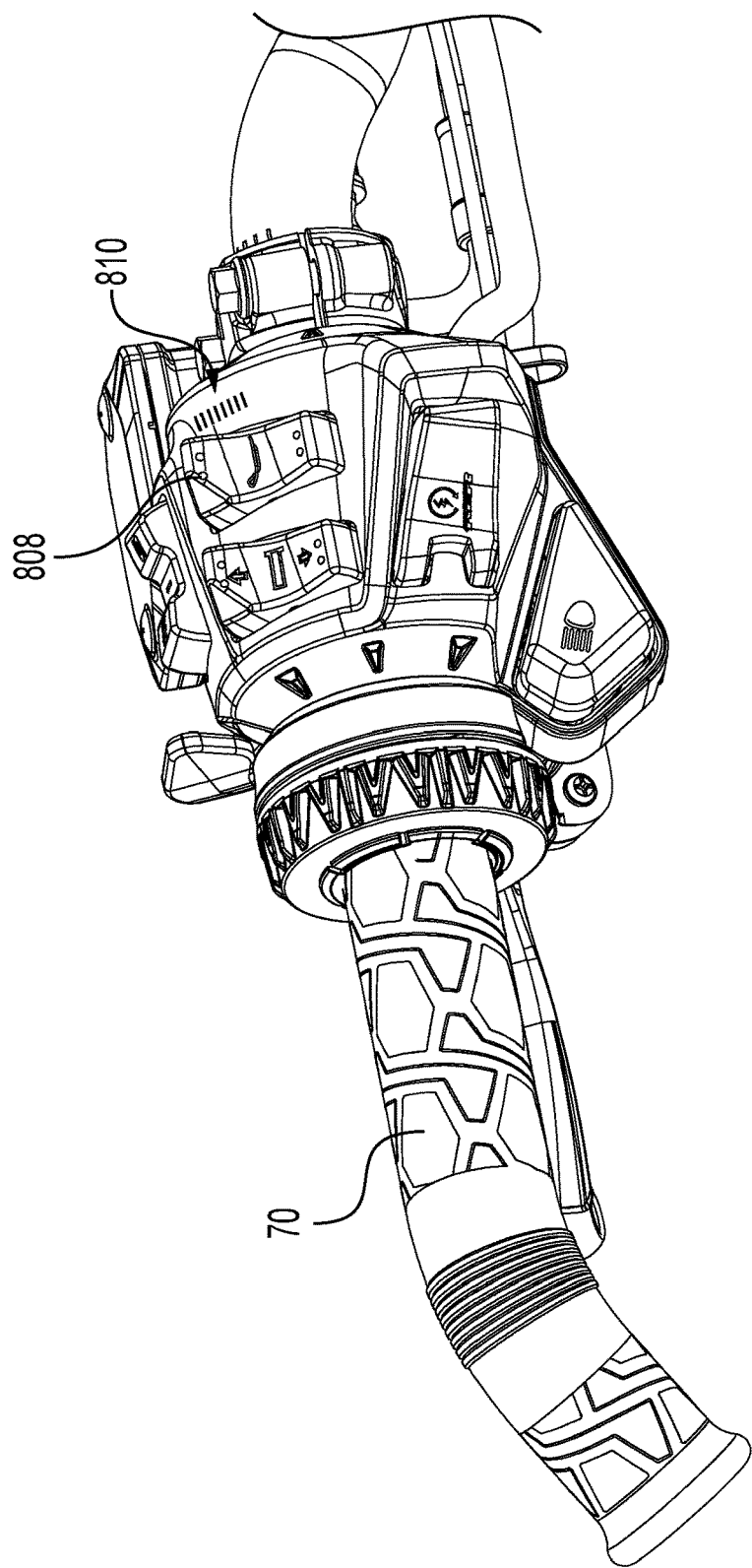
FIG. 27 is a perspective view, taken from a top, left and rear, of an implementation of the switch of FIG. 22.

With reference to FIG. 27, in the illustrated implementation, the switch 808 is a toggle switch having eight different positions 810. One of the positions 810 corresponds to the ski runner 106 being in a raised position as in FIGS. 21 to 24 with the bottom 126 being disposed above the lower portions 116, 118 of the wheels 110, 112. The remaining seven positions 810 correspond to different lowered positions of the ski runner 106 where the bottom 126 of the ski runner 106 is disposed lower than the portions 116, 118 of the wheels 110, 112. The driver of the snowmobile 20 can toggle the switch 808 to any one of the eight positions to cause the ski runner 106 to be placed in a corresponding position with respect to the wheels 110, 112. It is contemplated that the correspondence between the switch position 810 and the relative vertical positioning of the ski runner 106 with respect to the wheels 110, 112 could be different than as described herein. It is contemplated that the number of positions 810 could be more or less than eight. At least one of the positions 810 corresponds to the ski runner 106 being in a raised position where the bottom 126 of the ski runner 106 is disposed vertically higher than the lower portions 116, 118 of the wheels 110, 112 such that the ground G is engaged by the lower portions 116, 118 of the wheels 110, 112 as shown in FIG. 22. At least one of the positions 810 corresponds to the ski runner 106 being in a lowered position where the bottom 126 of the ski runner 106 is disposed vertically lower than the lower portions 116, 118 of the wheels 110, 112 and engages the ground G as shown in FIG. 25.

As shown schematically in FIG. 22, the electric motor 802 and the switch 808 are each connected to an electronic control module 850 for controlling the position of the ski runner 106. Although not shown, the electronic control module 850 is connected to the respective electric motors 802 of both the left and right ski assemblies 800. The electronic control module 850 receives a signal from the switch 808 indicative of the position 810 of the switch 808. The electronic control module 850 simultaneously activates the respective electric motors 802 of both the left and right ski assemblies 800 based on the position of the switch 808.

As can be seen in FIG. 22, in the illustrated implementation, the ski runner adjustment assembly 800 includes a runner position sensor 830 which senses the position of the ski runner 106. As an example, the runner position sensor 830 could be in the form of a linear potentiometer which is configured to be sensitive to the position of the screw 342 (FIG. 15) or another object fixed to the screw 342 and moveable therewith. As the screw 342 is indicative of the position of the ski runner 106, the linear potentiometer would be sensitive to the position of the ski runner 106. The runner position sensor 830 is connected to the electronic control module 850 for providing a signal thereto indicative of the current position of the ski runner 106. Although not shown, the electronic control module 850 is connected to the respective runner position sensors 830 of both the left and right ski assemblies 800.

With reference to FIG. 28, in the illustrated implementation, an indicator 820 is included in the display cluster 80 to provide a visual indication of the switch position 810 and the position of the ski runner 106. The indicator 820 includes an array 822 of eight rectangles corresponding to the eight switch positions 810, with one of the rectangles 824 being filled to indicate the current position of the ski runner 106. When the toggle switch 808 is moved from a first switch position 810 corresponding to a current position of the ski runner 106 to a second switch position 810 corresponding to a desired position of the ski runner 106, the rectangle on the indicator 820 corresponding to the second switch position 810 begins flashing. The rectangle corresponding to the second switch position 810 stops flashing and becomes filled once the ski runner 106 is disposed in the desired position corresponding to the second switch position 810. As can be seen in FIG. 22, the indicator 820 is connected to the electronic control module 850 for receiving signals therefrom indicative of the positions of the ski runner 106 and the switch 808.

Other implementations of the ski assembly are also contemplated. For instance, the ski assembly could include three wheels: front and rear wheels as in the ski assembly 100 and a central wheel as in the ski assembly 500. In an alternative implementation, the ski assembly could include two wheels that are laterally offset from the longitudinal centerline of the ski and/or the ski runner. For instance, a front wheel could be connected to the ski on the front right side of the ski runner and a rear wheel could be connected to the ski on the rear left side of the ski runner, or vice-versa.

Modifications and improvements to the above-described implementations of the present may become apparent to those skilled in the art. For example, each ski assembly could be provided with more than one ski runner connected to the ski runner adjustment assembly. The foregoing description is intended to be exemplary rather than limiting. The scope of the present is therefore intended to be limited solely by the scope of the appended claims.

What is claimed is:

1. A snowmobile ski assembly comprising:
a ski having a bottom;
at least one wheel rotatably connected to the ski, the at least one wheel comprising a lower portion extending below the bottom of the ski;
a ski runner being operatively connected to the ski, the ski runner being movable relative to the ski between a first position and a second position;
a bottom of the ski runner being above the lower portion of the at least one wheel when the ski runner is in the first position; and
the bottom of the ski runner being below the lower portion of the at least one wheel when the ski runner is in the second position.

2. The snowmobile ski assembly of claim 1, further comprising a ski runner adjustment assembly connected to the ski runner, the ski runner adjustment assembly selectively moving the ski runner between the first and second positions.

3. The snowmobile ski assembly of claim 2, wherein:
the ski pivots about a laterally extending ski pivot axis;
the ski runner adjustment assembly is connected about the ski pivot axis; and
the ski pivots about the ski pivot axis relative to the ski runner adjustment assembly.

4. The snowmobile ski assembly of claim 1, wherein the bottom of the ski runner is closer to the bottom of the ski in the first position than in the second position.

5. The snowmobile ski assembly of claim 1, wherein:
the ski defines a slot; and
the ski runner is disposed in the slot.

6. The snowmobile ski assembly of claim 5, wherein:
the at least one wheel comprises a front wheel rotatably connected to the ski forward of the slot and a rear wheel rotatably connected to the ski rearward of the slot;
the front wheel is rotatably connected to the ski via a front wheel frame,
the front wheel frame comprises a front slot adapted for receiving a front portion of the ski runner;
the rear wheel is rotatably connected to the ski via a rear wheel frame; and
the rear wheel frame comprises a rear slot adapted for receiving a rear portion of the ski runner.

7. The snowmobile ski assembly of claim 1, wherein the at least one wheel is laterally aligned with a longitudinal centerline of the ski.

8. The snowmobile ski assembly of claim 1, wherein:
the ski has a central keel; and
the lower portion of the at least one wheel extends below the central keel of the ski.

9. The snowmobile ski assembly of claim 1, wherein:
the ski has an external keel, the external keel being laterally offset from a longitudinal centerline of the ski; and
the lower portion of the at least one wheel extends below the external keel of the ski.

10. The snowmobile ski assembly of claim 1, wherein:
the ski pivots about a laterally extending ski pivot axis; and
the at least one wheel comprises a front wheel rotatably connected to the ski forward of the ski pivot axis, and a rear wheel rotatably connected to the ski rearward of the ski pivot axis.

11. The snowmobile ski assembly of claim 10, wherein the rear wheel is rotatably connected to the ski rearward of the ski runner.

12. The snowmobile ski assembly of claim 10, wherein lower portions of the front and rear wheels extend below a central keel of the ski.

13. The snowmobile ski assembly of claim 10, wherein:
the ski has an external keel, the external keel being laterally offset from a longitudinal centerline of the ski; and
lower portions of the front and rear wheels extend below the external keel of the ski.

14. The snowmobile ski assembly of claim 10, wherein:
the front wheel is rotatably connected to the ski via a front wheel frame; and
the rear wheel is rotatably connected to the ski via a rear wheel frame.

15. The snowmobile ski assembly of claim 14, wherein the front wheel frame and the rear wheel frame define a portion of a central keel of the ski.

16. The snowmobile ski assembly of claim 14, wherein:
the front wheel frame is received in the ski in a front slot; and
the rear wheel frame is received in the ski in a rear slot.

17. The snowmobile ski assembly of claim 14, wherein:
the front wheel frame comprises a front ski adapter and a front wheel adapter;
the front ski adapter connects the front wheel adapter to the ski;
the front wheel is rotatably connected to the front wheel adapter;
the rear wheel frame comprises a rear ski adapter and a rear wheel adapter;
the rear ski adapter connects the rear wheel adapter to the ski; and
the rear wheel is rotatably connected to the rear wheel adapter.

18. The snowmobile ski assembly of claim 17, wherein:
the front wheel adapter is received inside the front ski adapter; and
the rear wheel adapter is received inside the rear ski adapter.

19. The snowmobile ski assembly of claim 1, wherein the ski comprises a handle connected to an upturned front portion of the ski.

20. The snowmobile ski assembly of claim 1, wherein:
the at least one wheel is rotatably connected to the ski about an axle;
the axle has a fixed position relative to the ski; and
the lower portion of the at least one wheel extends below the bottom of the ski in the first position of the ski runner and in the second position of the ski runner.

* * * * *